US011220229B2

(12) United States Patent
Lunde

(10) Patent No.: US 11,220,229 B2
(45) Date of Patent: Jan. 11, 2022

(54) MODULAR POWER DISTRIBUTION DEVICE

(71) Applicant: Reid Lunde, Kennewick, WA (US)

(72) Inventor: Reid Lunde, Kennewick, WA (US)

(73) Assignee: Reid Lunde, Kennewick, WA (US)

( * ) Notice: Subject to any disclaimer, the term of this patent is extended or adjusted under 35 U.S.C. 154(b) by 265 days.

(21) Appl. No.: 16/278,024

(22) Filed: Feb. 15, 2019

(65) Prior Publication Data

US 2020/0262368 A1 Aug. 20, 2020

(51) Int. Cl.
| | |
|---|---|
| *B60R 16/033* | (2006.01) |
| *H01R 12/53* | (2011.01) |
| *H01R 12/75* | (2011.01) |
| *H01R 13/52* | (2006.01) |
| *B60R 16/02* | (2006.01) |
| *B60R 16/023* | (2006.01) |
| *H01M 10/6551* | (2014.01) |
| *B60R 16/03* | (2006.01) |
| *H01R 9/22* | (2006.01) |

(52) U.S. Cl.
CPC ........ *B60R 16/033* (2013.01); *B60R 16/0207* (2013.01); *B60R 16/0231* (2013.01); *B60R 16/0238* (2013.01); *B60R 16/03* (2013.01); *B60R 16/0315* (2013.01); *H01M 10/6551* (2015.04); *H01R 9/22* (2013.01); *H01R 12/53* (2013.01); *H01R 12/75* (2013.01); *H01R 13/5205* (2013.01); *H01R 13/5213* (2013.01); *H01R 2201/26* (2013.01)

(58) Field of Classification Search
CPC .... H01R 12/75; H01R 12/53; H01R 13/5213; H01R 13/5205; H01R 9/22; H01R 2201/26; B60R 16/033; B60R 16/0207; B60R 16/0238; B60R 16/03; B60R 16/0231; B60R 16/0315; H01M 10/6551
USPC .......... 439/135, 146, 144, 620.15, 715, 535, 439/76.1, 76.2, 34, 92, 374, 286, 283, 439/284, 141, 141.4, 141.8, 139, 9.1
See application file for complete search history.

(56) References Cited

U.S. PATENT DOCUMENTS

| | | | |
|---|---|---|---|
| 8,790,126 B2 * | 7/2014 | Byrne .................... | H02G 3/00 439/215 |
| 9,941,605 B2 * | 4/2018 | Scanzillo ............... | H01R 4/305 |
| 10,141,700 B2 * | 11/2018 | Dupuis ................. | H01R 33/90 |

(Continued)

*Primary Examiner* — Arnold M Kinkead

(57) ABSTRACT

A modular power distribution device for vehicles that couples to adjacent devices mechanically and electrically without a common housing or mounting plate. The devices share user selectable electrical connections internally to change the function of the devices and reduce the complexity of adding additional devices. The electrical contacts on the device are protected by a weather-resistant seal created when the device engages with wiring, adjacent devices or the provided covers. Covers may also house a communications receiver/transceiver and a microcontroller to control the device using wired or wireless communications. A mounting bracket is removably attached to each device and may be separated from the device without removing the mounting bracket from the vehicle. Each device can couple to a preceding device while the preceding device remains mounted to a substrate and connected to wiring. The devices may house semiconductor relays or electromechanical relays for use in direct current electrical systems.

29 Claims, 23 Drawing Sheets

(56) References Cited

U.S. PATENT DOCUMENTS

2020/0008312 A1* 1/2020 Jagoda ................. H05K 5/0034
2020/0313128 A1* 10/2020 Schnakenberg ...... H01M 50/10

* cited by examiner

MODULAR POWER DISTRIBUTION DEVICE

FIELD OF THE INVENTION

The invention relates generally to power distribution devices for vehicles.

BACKGROUND

Vehicles; such as cars, trucks, boats, personal recreational vehicles, airplanes, helicopters, military vehicles and others use relays to switch on high current devices such as fans, pumps, lights, etc. Relays are typically triggered by a control unit or a manual switch by means of wiring or wireless communication and each relay is attached to wiring that supplies battery power and ground. Therefore, attaching wiring to multiple relays is time consuming and messy, requiring wire splicing and redundancy. It would be desirable to share electrical connections internally among multiple relays to avoid the need for wire splicing as new relays are added.

Occasionally a power distribution unit that houses multiple relays may be used to trigger multiple devices but power distribution units have a fixed number of outputs adding to initial expense and bulkiness.

Relays and power distribution units are designed with a fixed ampacity, requiring the user to know the required ampacity before purchasing a relay. Increasing ampacity from a system of relays and power distribution units is routinely achieved by external wire splicing. It would be desirable to increase ampacity without wire splicing.

Typically relays and power distribution units require connectors that use crimped pins and require a specific crimping tool. The crimped pins and crimping tool are specific to the connector and difficult to source. A connection method that may not require crimped pins and may also offer a substantially weather-resistant seal would be desirable.

Relays with microcontrollers and communications receivers and transceivers are typically configured in a common housing without modularity, or they are connected together using wiring or a common mounting plate, or within a bulky housing that accepts modules. It would be desirable for a relay to be configured such that a microcontroller and communications receiver/transceiver could removably attach to a single relay while the relay remained connected to the wiring and to the vehicle. And furthermore, it would be desirable for multiple relays to removably attach to each other to share electrical connections without the need for a common housing or shared mounting plate while preceding relays remain connected to the wiring and to the vehicle.

SUMMARY OF THE INVENTION

In general, the disclosure relates to a modular power distribution device for vehicles. In one embodiment the invention is directed to a relay enclosed within a housing. The housing has electrical contacts disposed at the front, a first side and a second side. The electrical contacts are enclosed on the sides between the housing and removable covers. Vehicle wiring connects to the electrical contacts at the front of the device using screw terminals to securely connect the device to vehicle wiring behind a semi-detachable elastomer panel with multiple openings configured for a reasonable range of stranded, insulated wiring diameters used in vehicles. The wiring must pass through the openings in the elastomer panel before connecting with the electrical contacts disposed on the front of a device. The elastomer panel provides strain relief for the wiring and a weather-resistant seal with the wiring insulation and along the perimeter of the elastomer panel where it contacts the housing of the device. In another embodiment the device connects to a vehicle's wiring at the front of the device where electrical contacts are disposed and the housing is configured to engage the wiring by means of an electrical connector. The electrical connector may be configured to provide weather-resistance for the electrical contacts by means of a sealing element between the connector and the housing of the device.

The devices are configured such that a plurality of devices may be coupled together electrically and mechanically to create a modular system of devices that does not require a common housing or mounting plate as each device has its own removably attached mounting bracket. Subsequent devices couple to preceding devices in such a way that is sturdy enough that the subsequent devices do not require the use of their own mounting bracket although they are configured to accept one. The devices may be individually coupled and uncoupled from each other and device(s) may be removed from an adjacent device without requiring the removal of the remaining devices. Further, each device may couple to the right or left of an adjacent device. Devices may couple and uncouple from each other while mounted to a substrate and without requiring the removal of wiring from the remaining devices. The coupled devices share electrical power internally thus replacing the need for wire splicing as new devices are added. The devices form a substantially weather-resistant seal when coupled together, providing environmental protection for the electrical connections.

When the device is used alone, the electrical contacts on the sides of the device are enclosed between the housing and removable covers on the left and right side of the device. When attached, the removable covers form a substantially weather-resistant seal enclosing the electrical contacts between the respective cover and the housing. When adjacent devices are coupled together, a substantially weather-resistant seal is formed, enclosing the electrical contacts. The coupling mechanism is configured to assure functional interlocking of the devices to withstand vibration, especially in an automotive environment, while retaining a compact overall size of the device. Devices may be coupled to the left or the right of a preceding device to allow for symmetry and where space constraints may not allow a plurality of devices to be connected subsequently in only one direction. In one embodiment each device has an insulating cover that covers selected electrical contacts on one side of the device such that the insulated contacts do not connect electrically when adjacent devices are coupled together on the side in which the insulating cover is in place. The physical shape of the insulating cover determines which electrical contacts are insulated. If the user wishes to share all electrical contacts between coupled devices, the insulating cover may be removed and the devices may be coupled together without the insulating cover in place. The insulating cover therefore affects the functionality between coupled devices.

Sometimes it is necessary to remove a relay from its mount quickly. For example, a relay may be mounted with a nut and bolt and it may be difficult to access the nut on the back side of a mounting panel. In another example a relay may be zip-tied to the vehicle in a hard-to-reach place where it's difficult to reach the zip-tie to cut it to allow removal. In these instances it is very useful to quickly remove the device from the mounting bracket while the mounting bracket remains attached to the vehicle. In one embodiment, a mounting bracket removably attaches to the device to allow the device to be removed from the mounting bracket without tools. A secondary benefit is that the coupling of an adjacent device to a mounted device holds the adjacent device in place so a user can drill a mounting hole to affix the mounting bracket for the adjacent device to the vehicle. In another embodiment, the mounting bracket engages a heat sink extending from the internal cavity of the housing and aids in the dissipation of heat generated by the electrical components.

In one embodiment, the invention is directed to a modular power distribution device comprising a housing having at least three sides and an electrical assembly substantially enclosed by the housing wherein the electrical assembly comprises multiple electronic components and has electrical contacts disposed on the front and sides of the housing. The electrical contacts at the front of the device are configured to engage with stranded and insulated wires either directly through a semi-detachable elastomer panel with openings of one or more size, the panel having a perimeter that engages with the housing and the wiring insulation to form a substantially weather-resistant seal, the semi-detachable elastomer panel further enclosing the electrical contacts disposed on the front of the housing between the housing and the panel; or by engaging an electrical connector which houses crimped pins, or soldered pins or crimped and soldered electrical pins attached to stranded wiring. Each device further comprising a connector disposed on a first side of the device, sized to engage electrically and mechanically with a second side of an adjacent device and a connector disposed on a second side of the device, sized to engage electrically and mechanically with a first side of an adjacent device. Each device has a cover on either side of the housing that removably attaches to enclose the electrical contacts and provide weather-resistance to the electrical contacts between the cover and the housing. The covers may contain a communications receiver or transceiver and a microcontroller attached to a printed circuit board, wherein the printed circuit board interfaces with the electrical contacts disposed on the side of the device and the microcontroller can be programmed to control components of the device's electrical assembly based on communications received via transmission wires or wireless transmission such as radio frequency, Bluetooth, WiFi or other wireless communication methods. The device further comprising a mounting bracket that removably attaches to the device in such a way that the device may be removed from the mounting bracket while the mounting bracket is attached to a substrate. The device further comprising an insulating cover removably attached to a side that insulates selected electrical contacts on the side in which it is removably attached while still allowing the devices to couple together on either side.

In another embodiment, the invention is directed to a system comprising a plurality of power distribution devices arranged linearly, each removably attached to individual mounting brackets attached to a substrate, each configured to attach to either side of a preceding device, without requiring the removal of the preceding device(s) from the substrate. Each device comprising a housing having at least three sides and an electrical assembly substantially enclosed by the housing wherein the electrical assembly comprises multiple electronic components and has electrical contacts disposed on the front and sides of the housing. The electrical contacts on at least one side are configured to engage with stranded and insulated wires either directly through a semi-detachable elastomer panel with openings of one or more size, the panel having a perimeter that engages with the housing and the wiring insulation to form a substantially weather-resistant seal, the semi-detachable elastomer panel further enclosing the electrical contacts disposed on the front of the housing between the housing and the panel; or by engaging an electrical connector which houses crimped pins, or soldered pins or crimped and soldered electrical pins attached to stranded wiring. Each device further comprising a connector disposed on a first side of the device, sized to engage electrically and mechanically with a second side of an adjacent device and a connector disposed on a second side of the device, sized to engage electrically and mechanically with a first side of an adjacent device wherein electrical power is shared among attached devices.

In another embodiment the invention is directed to a method of operating a modular power distribution device comprising removably attaching a mounting bracket to the device, connecting wiring to the device, removably attaching a first side cover to a first side of the device, removably attaching a second side cover to a second side of the device. The method may also include removing the first or second side cover and replacing it with a first or second side cover containing a communications receiver or transceiver and a microcontroller attached to a printed circuit board, wherein the printed circuit board interfaces with the electrical contacts disposed on the side of the device and the microcontroller can be programmed to control components of the electrical assembly based on communications received via transmission wires or wireless transmission such as radio frequency, Bluetooth, WiFi or other wireless communication methods. The method may also include removing wire insulation and inserting the wiring through an elastomer panel, and connecting wiring to the electrical contacts disposed on the front of the device or removing wire insulation and crimping pins on the end of the wire using a crimping tool and inserting it into a connector, then plugging the connector into the device. The method may also include attaching the mounting bracket to a substrate.

In another embodiment the invention is directed to a method of operating a system of modular power distribution devices comprising supplying power to a first one of a plurality of devices using stranded and insulated wires through electrical contacts on a device, distributing said power through electrical contacts disposed on a first side of the first one of a plurality of devices, removing a first side cover on a first one of a plurality of devices and removing a second side cover on a second one of a plurality of devices, coupling the first side of a first one of a plurality of devices and a second side of a second one of a plurality of devices, thus engaging the first and second devices electrically and mechanically, further distributing said power through electrical contacts disposed on a second side of the first one of a plurality of devices, removing a second side cover on a first one of a plurality of devices and removing a first side cover on a third one of a plurality of devices, coupling the second side of a first one of a plurality of devices and a first side of a third one of a plurality of devices, thus engaging the first and third devices electrically and mechanically, successively coupling each remaining one of a plurality of devices to an immediately preceding adjacent device. The method may also include identifying the endmost one of a plurality of devices to be uncoupled, disconnecting the identified device from its mounting bracket, translating the identified device to a non-interlocked position relative to the adjacent device to which it is coupled and uncoupling the device without removing preceding devices. The method may also include removing the first or second side cover and replacing it with a first or second side cover containing a communications receiver or transceiver and a microcontroller attached to a printed circuit board, wherein the printed circuit board interfaces with the electrical contacts disposed on the side of the device and the microcontroller can be programmed to control components of the electrical assembly based on communications received via transmission wires or wireless transmission such as radio frequency, Bluetooth, WiFi or other wireless communication methods. The method may also include successively coupling further comprising removing the side covers from adjacent sides of adjacent devices and coupling the devices together. The method may also include removably attaching a mounting bracket to each device.

In another embodiment the invention is directed to a method of operating a system of modular power distribution devices comprising supplying power to a first one of a plurality of devices using stranded and insulated wires through electrical contacts on a device, distributing said power through electrical contacts disposed on a side of the first one of a plurality of devices wherein a connector is disposed on a side of the device, sized to engage electrically and mechanically with a side of an adjacent device, inserting an insulating cover configured to insulate selected electrical contacts on the side in which it was inserted and between said side and an immediately adjacent device, coupling adjacent devices and thus engaging the devices electrically and mechanically, successively coupling each remaining one of a plurality of devices to an immediately preceding adjacent device.

The details of one or more embodiments of the invention are set forth in the description and accompanying drawings. Other features of the invention will become apparent from the description, drawings and claims.

DETAILED DESCRIPTION

A substantially weather-resistant modular power distribution device provides the ability to interconnect power distribution devices together and selectively share electrical connections internally between coupled devices. Subsequent devices may be coupled to preceding device(s) without the need for special tools while the preceding device(s) remain connected to wiring and mounted to a flat substrate or otherwise mounted to the vehicle. The user may removably couple multiple devices together to form a system of devices that selectively share electrical connections between devices and may be couple together without the use of a common housing or mounting plate. The devices may include connectors that mechanically and electrically connect each device to one or more adjacent devices. Each device has a connector on its first side that is configured to mechanically and electrically connect to the connector on the device's second side therefore allowing the devices to attach and detach from either side of each other. Each device has one cover for each connector, the cover forms a substantially weather-resistant seal and encloses the electrical contacts within the connector between the cover and the housing. Each cover may be replaced by a cover that houses a microcontroller and communications receiver/transceiver. The device may include a mounting bracket that engages a heat sink, and removably attaches to the device in such a way that the device may be removed from the mounting bracket without tools while the mounting bracket is mounted to a flat substrate.

Figure 1:
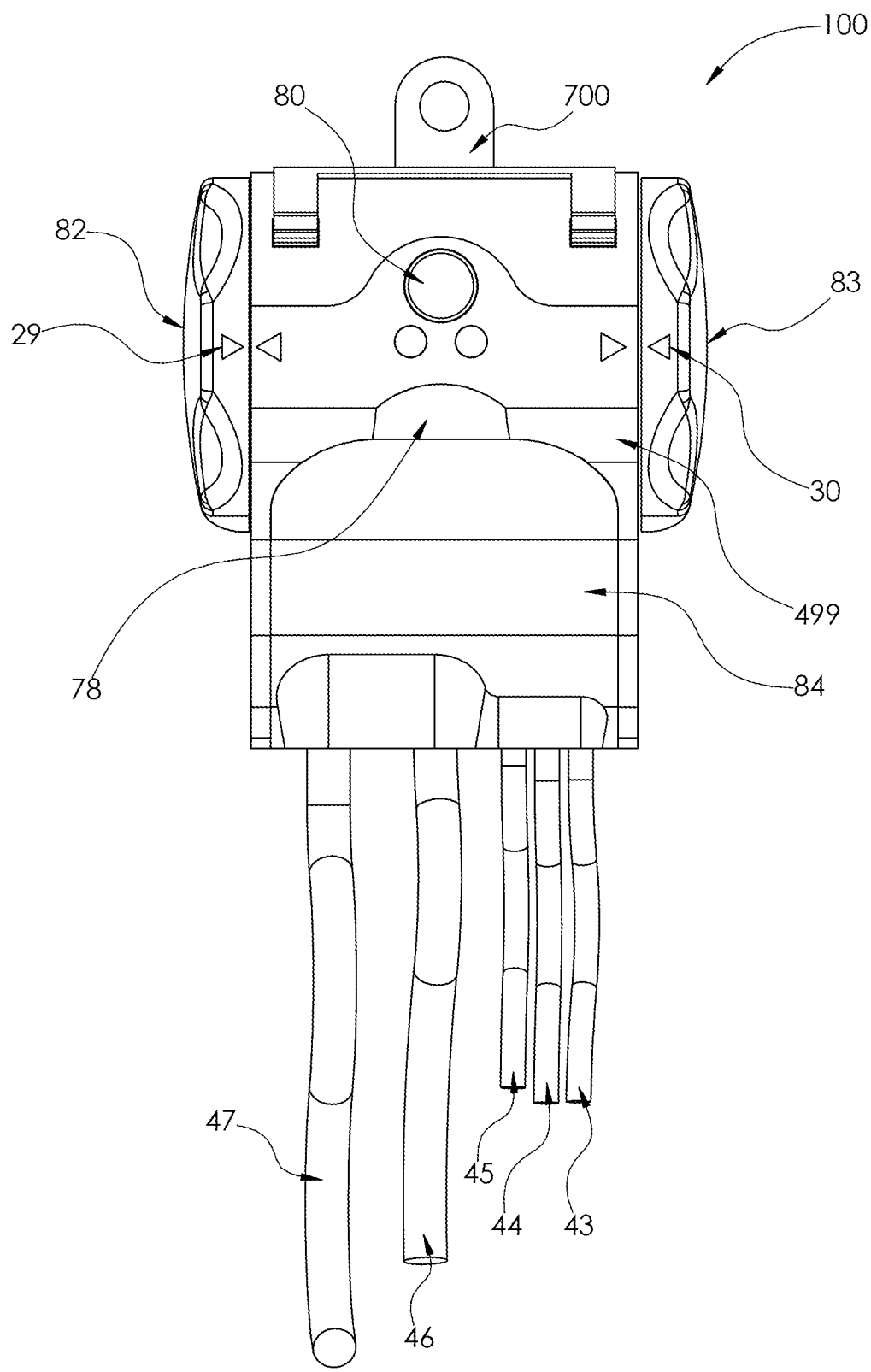
FIG. 1 is a top view of an example device engaged with wiring.

FIG. 1 shows a completely assembled exemplary device (100) as it may be installed and used. The device (100) comprises a housing (499) comprising an upper housing (500 in FIG. 5) and a lower housing (400 in FIG. 5), a semi-detachable weather-resistant panel (84), a second side removable cover (82), a first side removable cover (83), and a mounting bracket (300). The device further comprising a force on button (80) and locking position indicators (29, 30). The electrical contacts (not shown) are disposed between the semi-detachable weather-resistant panel (84) and the housing (499), and accessed by peeling back the upper portion of the panel (84) using the finger recess (78). The housing (499) may be injection molded from a thermoplastic material for relatively low per piece price and high strength in high heat, heavy vibration environments. The positive voltage supply wire (47) supplies input power for the device and any subsequent devices and is typically connected directly to the battery. The positive voltage output wire (46) supplies power to a device such as a fan, a motor, a pump, lights, etc. only when the device is triggered on. The ground reference wire (43) provides a source to ground for the device and any subsequent devices. The device is triggered on and delivers battery power to the positive voltage output wire (46) when one of two instances occurs: 1) the power trigger wire (45) is connected to battery power or 2) the ground trigger wire (44) is connected to vehicle ground. In the example shown there are five openings in the semi-detachable weather-resistant panel (84) however it shall be understood that there may be as many openings for wiring to pass through as the device requires and that the invention is not limited in this respect. Wiring (44, 45) is shown for illustration purposes only and in most instances a user will use one or the other, leaving a vacant opening in the elastomer panel (70 or 71 in FIG. 6) that may be plugged with a cavity plug to maintain weather resistance. The dimensions of each device (100) may vary depending on the application. For example, each device (100) may have a height generally between 1.0 inch and 2.0 inches, a width generally between 1.0 inch and 2.0 inches, and a depth generally between 1.0 in and 3.0 inches. In an example embodiment each device (100) may have a height of approximately 1.4 inches, a width of approximately 1.8 inches, and a depth of approximately 2.4 inches. It shall be understood, however, that the specific dimensions of the device (100) may vary depending on the ampacity of the application, as well as other factors, and that the invention is not limited in this respect.

Figure 2:
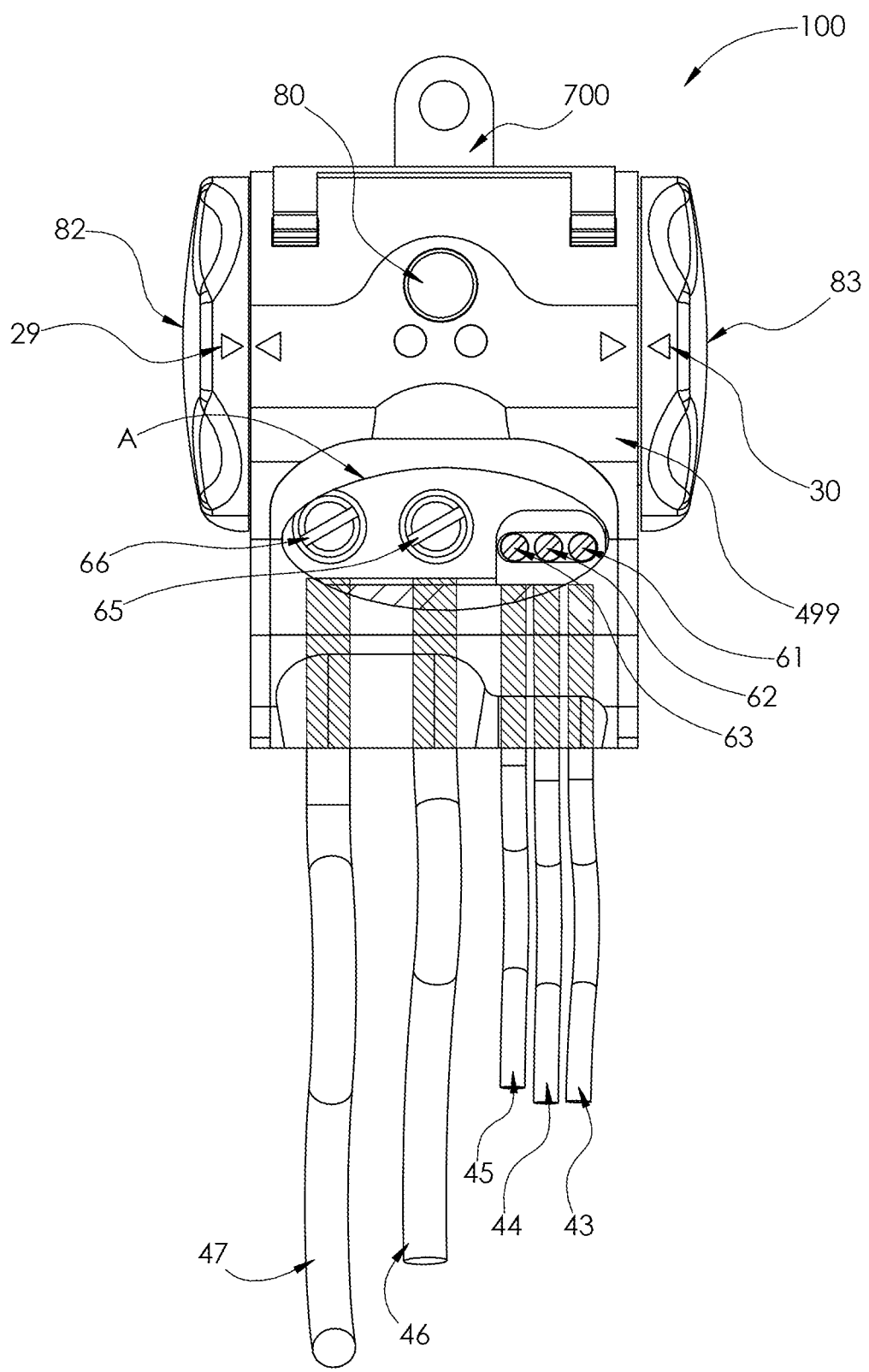
FIG. 2 is a top view of an example device engaged with wiring, with a cross-sectional window view.

FIG. 2 shows a completely assembled exemplary device with a cross sectional window view (A) illustrating how wiring may pass through the semi-detachable weather-resistant panel (84) and connect to the device using screw terminals (61, 62, 63, 65, 66). In this example screw terminals (61, 62, 63, 65, 66) are used to connect wiring (43-47) to the electrical contacts (95-99) disposed at the front of the device behind the panel (84). Although this example shows screw terminals as the connection apparatus any known connection method may be used and the invention is not limited in this respect.

Figure 3:
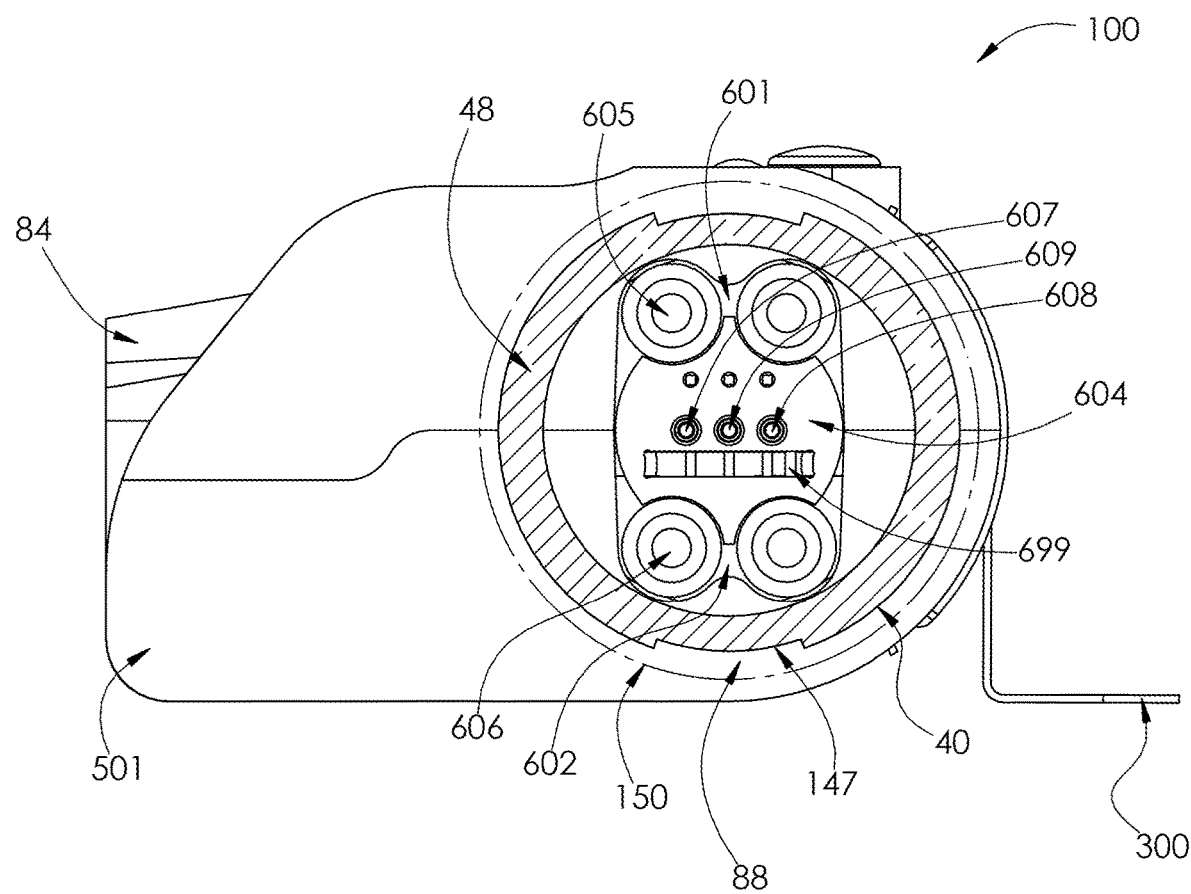
FIG. 3 is a right side view of an example device with the first side cover removed.
Figure 4:
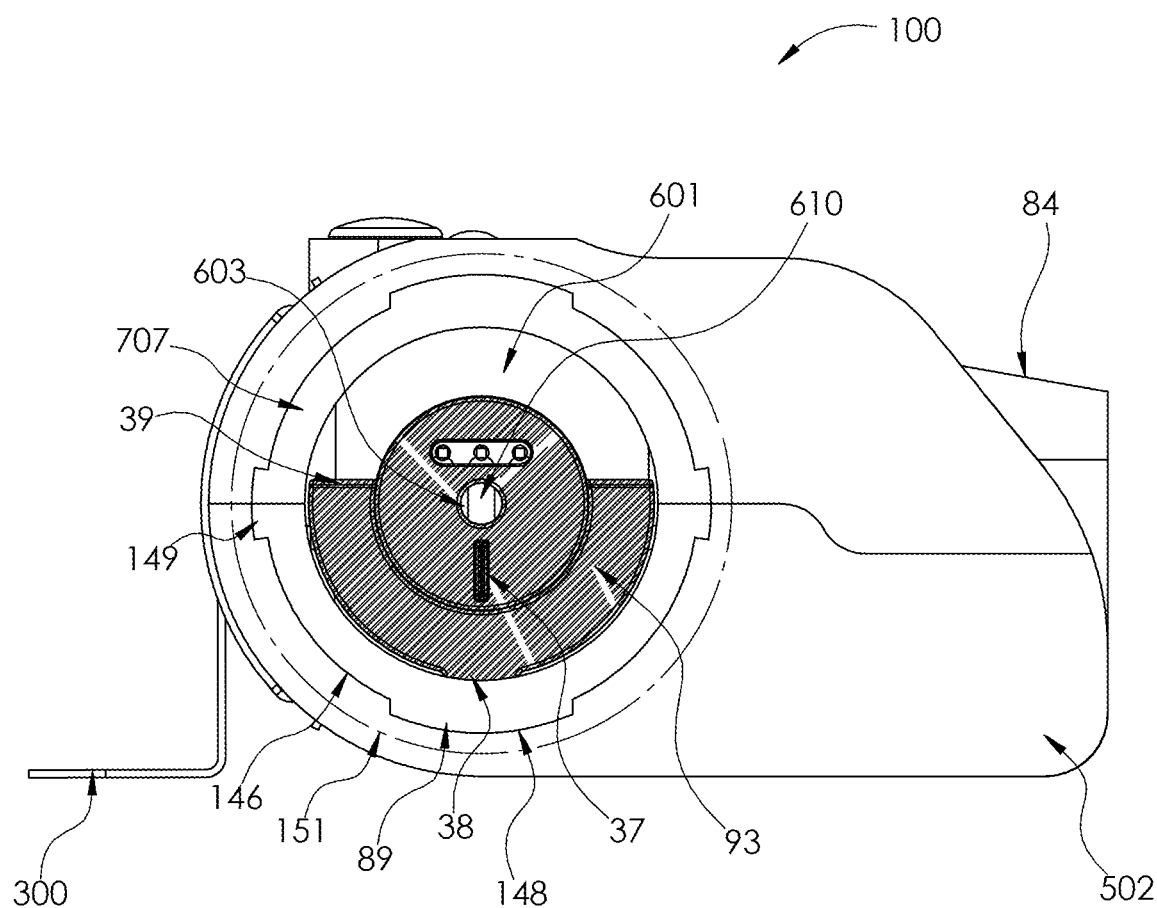
FIG. 4 is a left side view of an example device with the second side cover removed.

FIG. 3 is a right side view of an exemplary device (100) showing the first side (501) of the device. The device comprising a semi-detachable weather-resistant panel (84), a first side connector (150), and a mounting bracket (300). The first side connector (150) comprising the first side mechanical sealing element (48), the upper buss bar (601), the lower buss bar (602), the first side printed circuit board (604), the main printed circuit board (699), the positive voltage input port pogo pins (605), the positive voltage output port pogo pins (606), the ground trigger port pogo pin (607), the positive voltage trigger port pogo pin (608), and the ground reference port pogo pin (609). The first side connector (150) is configured to engage electrically and mechanically with the second side connector (151 as shown in FIG. 4) of an adjacent device. In this example, the first side connector (150) includes a receptacle with a receiving perimeter (40) and a first side interlocking feature (88) having a perimeter edge (147) with an internal diameter.

The second side connector (151 as shown in FIG. 4) includes a protrusion with a perimeter edge (148 in FIG. 4) having a diameter slightly smaller than the diameter of the receiving perimeter (40). Adjacent devices may be coupled together by engaging the first side connector (150) with the second side connector (151 in FIG. 4) by inserting the second side interlocking feature (89 in FIG. 4) into the first side receiving perimeter (40) along the axis of rotation (55 in FIG. 18) and rotating until the interlock position indicators (29, 30 in FIG. 2) align. In this example the upper bus bar (601) is electrically connected to the positive voltage input port (99 in FIG. 9) and the positive voltage input port pogo pins (605). In this example the positive voltage input port pogo pins (605) are a spring type conductor that extend distally perpendicular to the side plane configured to an appropriate length to contact electrical contacts of an adjacent device. The pogo pins (605-609) have a range of working heights that allow adjacent devices to couple together whether the removable insulating cover (93 in FIG. 5) is in place or not. In another example embodiment the mounting bracket (300) engages the housing and contacts a heatsink extending from the electrical assembly (600 in FIG. 6).

FIG. 4 is a left side view of an exemplary device (100) showing the second side (502) of the device with the removable insulating cover (93) in place. The insulating cover (93) including a ramp (39), a locating tab (38) and a handle (37). The insulating cover (93) insulates the lower buss bar and the second side PCB (603) from electrical contact when engaged with the first side connector (150 in FIG. 3). In the example shown, the insulating cover insulates the positive voltage trigger port contact pad (612), the ground trigger port contact pad (611) and the lower bus bar (602) such that when two adjacent devices are coupled, electricity is only allowed to flow between devices along the positive voltage input pogo pins (605 in FIG. 3) and the ground reference pogo pin (609 in FIG. 3) to the upper bus bar (601) and the ground reference port contact pad (610) respectively, of an adjacent device. The second side connector (151) is configured to engage electrically and mechanically with the first side connector (150 in FIG. 3) of an adjacent device. In this example, the second side connector includes a protrusion minor diameter (146), second side interlocking feature(s) (89) having a perimeter edge (148) with an external diameter, and rotation stop(s) (149). The first side connector (150 as shown in FIG. 3) includes a receptacle with a receiving perimeter (40) having a diameter slightly larger than the diameter of the perimeter edge (148). Adjacent devices may be coupled together by engaging the second side connector (151) with the first side connector (150 in FIG. 3) by sliding the first side receiving perimeter (40 in FIG. 3) over the second side interlocking feature (89) along the axis of rotation (55 in FIG. 18) and rotating until the interlock position indicators (29, 30 in FIG. 2) align.

Figure 5:
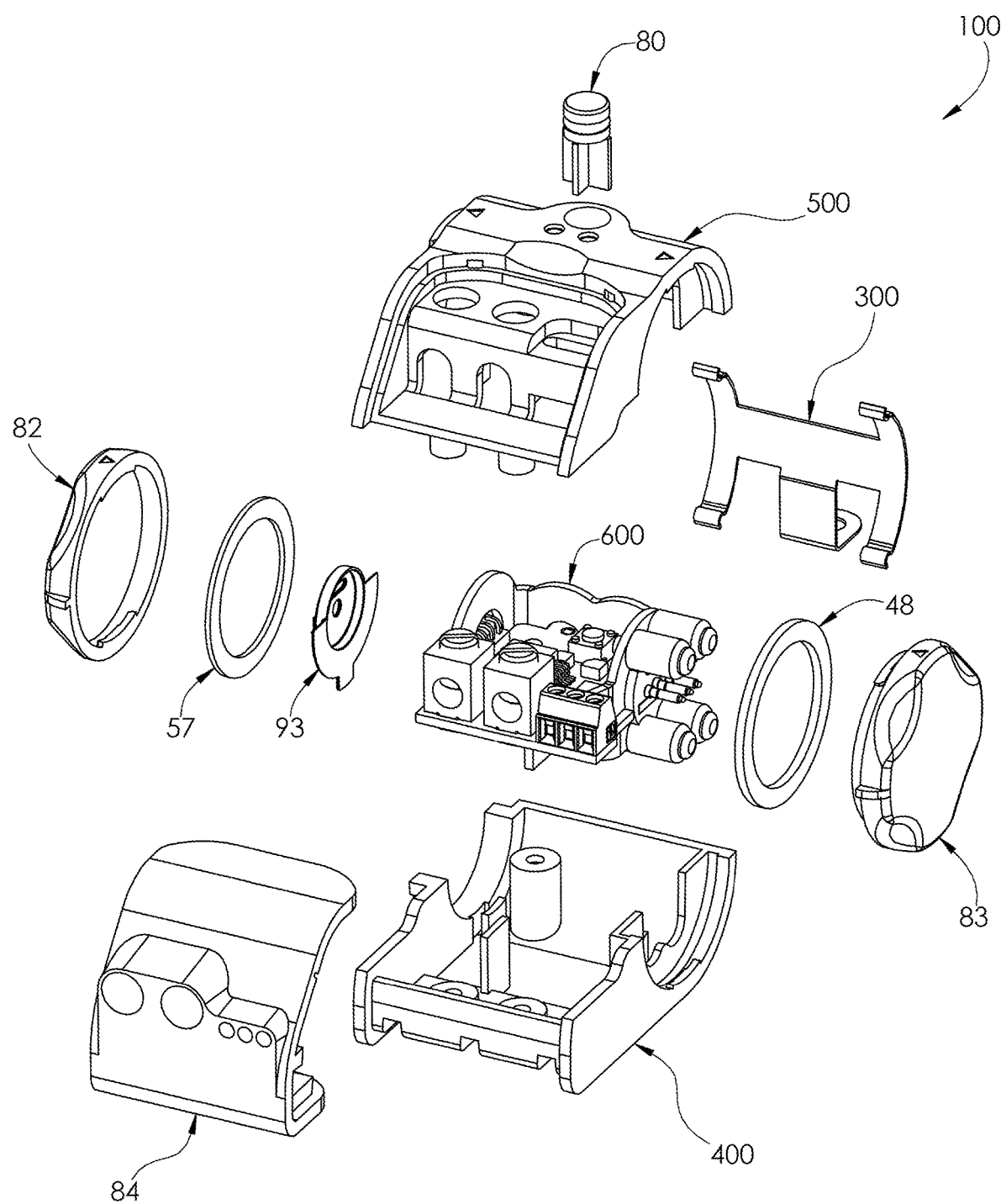
FIG. 5 is an exploded isometric view of an example device.

FIG. 5 is an exploded view of an example device (100). The device comprises: an upper housing (500), a lower housing (400), a semi-detachable weather-resistant panel (84), a second side cover (82), a weather-resistant seal (57), a first side cover (83), a first side mechanical sealing element (48), a mounting bracket (300), a force on button (80) and an electrical assembly (600). In this example the force on button (80) may depress a switch (81 in FIG. 9) mounted on the main PCB (699 in FIG. 9) and comprise an o-ring to provide weather-resistance between the force on button (80) and the upper housing (500).

Figure 6:
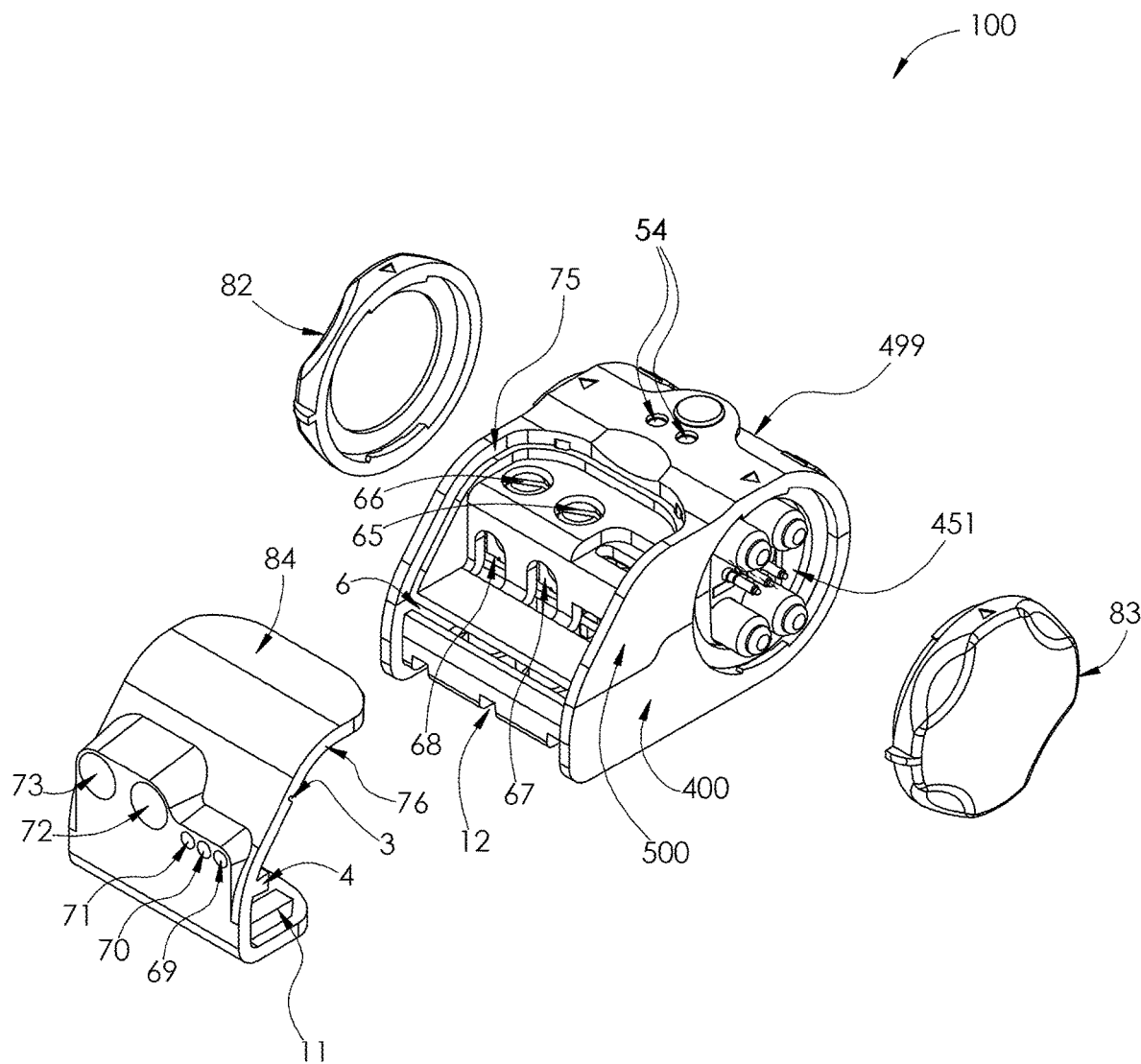
FIG. 6 is a partially exploded right-front isometric view of an example device.

FIG. 6 is a partially exploded view of the right side of an example device (100) using pogo pins in accordance with the present invention. However it shall be understood that aspects of the invention are applicable to a device using any type of contacts to electrically communicate between coupled devices. In this example, the housing (499) comprises an upper housing (500) and a lower housing (400) constructed from plastic, and manufactured by plastic injection molding. Bus bars are used to carry direct current electricity from the front ports to the side ports. Bus bars also provide a rigid mounting surface for the pogo pins and rigid support for the smaller PCBs. Although bus bars are shown to communicate electrically between the front ports and the side ports, it shall be understood that any number of methods may be used including but not limited to wiring and printed circuit board traces.

In this example the device (100) shows the semi-detachable weather-resistant panel (84) detached from the housing (499) to illustrate the elastomer panel retention protrusions (11) that have a dovetail configuration designed to engage the elastomer panel retention slots (12) and hold the lower portion of the panel (84) securely to the lower housing (400). The panel (84) also comprises a pinch protrusion (4) configured to engage with the upper housing (500) and lower housing (400) by means of the slot (6) (1 formed during manufacture. It shall be understood however, that the panel (84) may attach to the lower housing (400) using other known methods of attachment such as adhesive or other mechanical means and that the invention is not limited in this respect. The semi-detachable weather-resistant panel (84) is constructed from elastomeric material allowing it to deform and flex which allows it to separate from the upper housing (500) at the hinge point (3) allowing access to the ports (95-99 in FIG. 9). The semi-detachable weather-resistant panel (84) engages the upper housing (500) by the interface between the sealing surface (75) and the sealing and retaining ridge (76). This interface provides weather-resistance. Openings (69-73) are present at the front of the semi-detachable weather-resistant panel (84), the openings have a reducing inside diameter that engages with and forms a seal with wiring of differing diameter. When the wiring passes through the openings (69-73) in the semi-detachable weather-resistant panel (84) it may be electrically and mechanically connected to the ports (95-99 in FIG. 9) of the device (100) via the front port housing openings (67, 68) and (58, 59, 60 not shown) and held in place with the front port tightening screws (65, 66) and (63, 62, 61 in FIG. 2). One or more status indicator(s) (54), such as a light emitting diode (LED) or other visual indicator, may indicate various status parameters of the electrical assembly contained within the housing. For example when the device (100) is functioning properly in an "on" state, two indicators (54) may illuminate, in another example if the device (100) is in a fault condition such as over temperature in which it is latched off, only one indicator (54) may illuminate, and in another example when the device (100) is functioning properly in an "off" state, two indicators (54) may not illuminate. In this example the status indicators (54) are communicated through clear lenses in the upper housing (500) from light-emitting diodes of the electrical assembly.

Figure 7:
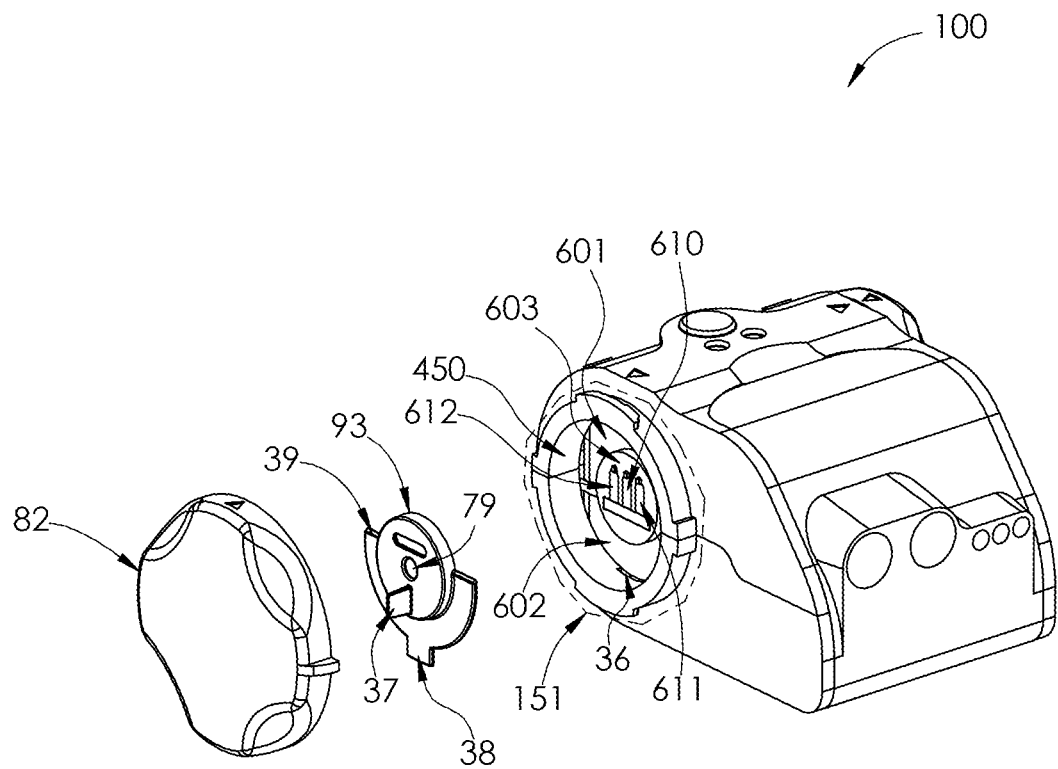
FIG. 7 is a partially exploded left-front isometric view of an example device.

FIG. 7 is a partially exploded view of the left side of an example device (100) that illustrates how the removable insulating cover (93) can be removably attached to the second side of the device through the second side housing opening (450), and enclosed between the second side cover (82) and the second side connector (151). The removable insulating cover (93) may cover the lower buss bar (602) and the ground trigger port contact pad (611) and the positive voltage trigger port contact pad (612) when in place. As illustrated in FIG. 7 an opening (79) may extend through the removable insulating cover (93) to allow for a pogo pin to connect electrically to the ground reference port contact pad (610) on the second side printed circuit board (603). The removable insulating cover (93) may also comprise a ramped edge (39) to allow pogo pins from an adjacent device to traverse across the ramp as adjacent devices are coupled and uncoupled from each other. The removable insulating cover (93) further comprising a locating tab (38) which may be inserted in the locating tab receptacle (36) in the lower housing (400) by means of a handle (37) to aid in attaching and detaching the removable insulating cover (93). FIG. 7 also illustrates that the removable insulating cover (93) leaves the upper buss bar (601) uncovered so that pogo pins from an adjacent device may contact it physically and connect to it electrically.

Figure 8:
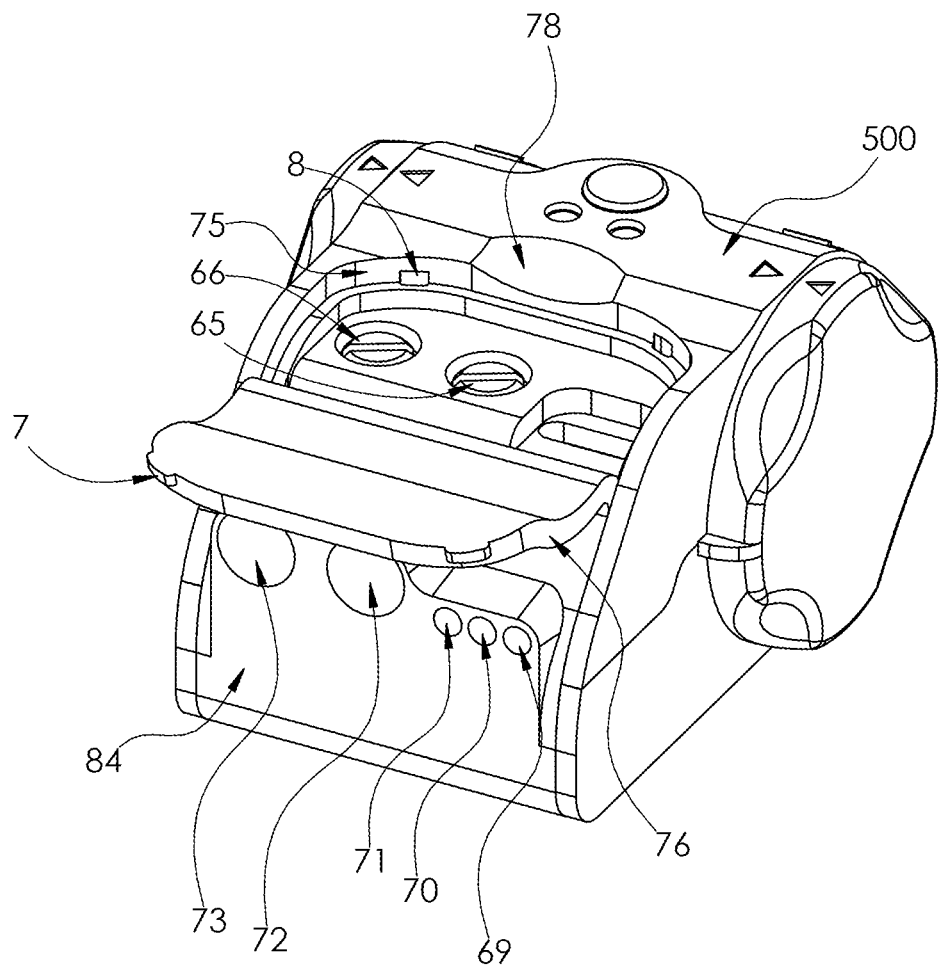
FIG. 8 is an isometric view of an example device.

FIG. 8 is an isometric view illustrating how an example semi-detachable weather-resistant panel (84) may allow access to the ports (95-99 in FIG. 9) and the screw terminals (61, 62, 63, 65, 66 in FIG. 2) when the upper portion of the semi-detachable weather-resistant panel (84) is hinged back from the upper housing (500). In this example the finger recess (78) allows access to the sealing and retaining face (76) of the panel (84) so it may be peeled back. The semi-detachable weather-resistant panel (84) forms a substantially weather-resistant seal when the sealing and retaining edge (76) engages the sealing surface (75) and the retention tab(s) (7) are engaged with the retention slot(s) (8). The semi-detachable weather-resistant panel (84) is secured between the upper housing (500) and lower housing (400) by pinching a protrusion (4 in FIG. 6) that extends from the semi-detachable weather-resistant panel (84) just below the openings (69-73), this protrusion is pinched by the upper housing (500) and lower housing (400) when the device is assembled during manufacture. The hinge (3) is just above the openings (69-73) to ensure that when the semi-detachable weather-resistant panel (84) is hinged open the wiring remains unstrained. The hinge (3) location above the openings (69-73) further aids in the guiding of wiring through the openings (69-73) into the ports (95-99 in FIG. 9) so that the tightening screws (61, 62, 63, 65, 66 in FIG. 2) may be accessed to secure the wiring to the device (100).

Figure 9:
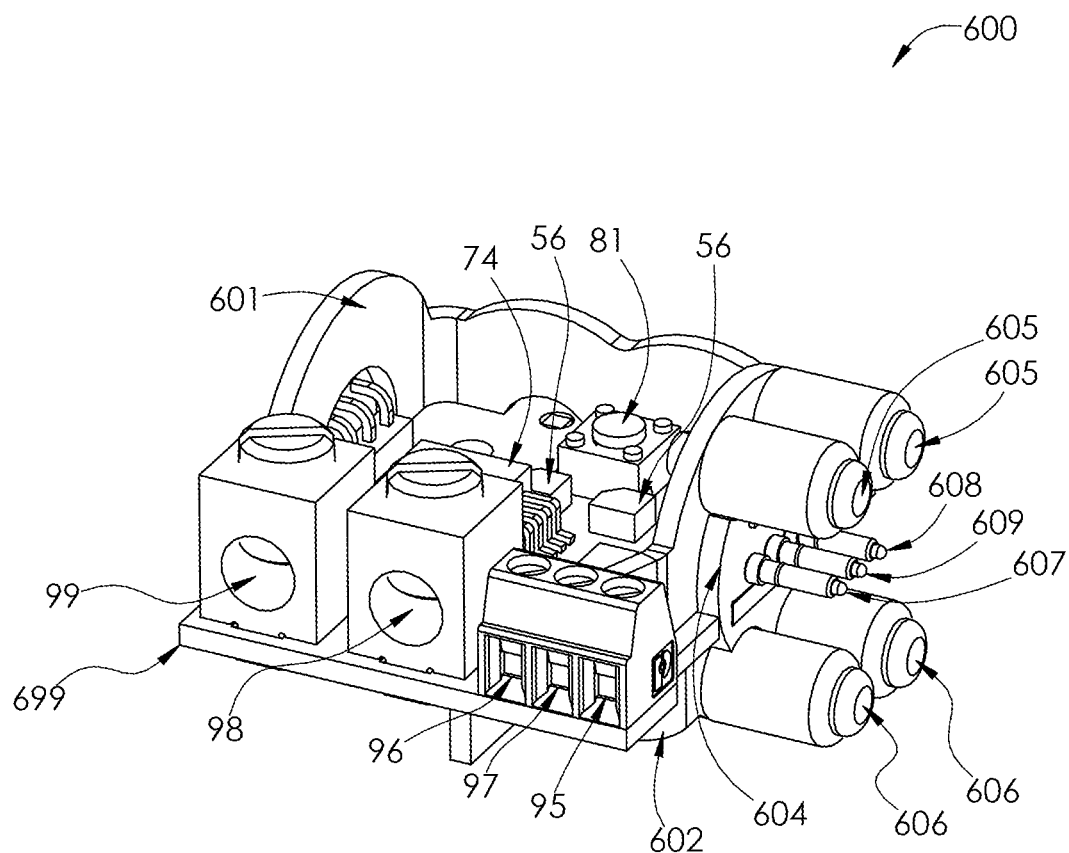
FIG. 9 is an isometric view of an example electrical assembly.

FIG. 9 illustrates an example electrical assembly showing how the front ports (95-99) communicate to the left and right side of the device. The right side of the device is configured to connect to the left side of an adjacent device and the left side of the device is configured to connect to the right side of an adjacent device. The assembly in this example uses screw terminals (61, 62, 63, 65, 66 in FIG. 2) to connect wiring to the assembly by means of the front ports (95-99), and then uses buss bars and PCB traces to communicate the electrical signals from the front ports (95-99) to the left and right side of the device simultaneously. This example also shows a PCB mounted momentary switch (81) that may be used to "force on" the device by means of a force on button (80 in FIG. 5) that extends to the exterior of the housing to be pressed by a user. The electrical assembly (600) comprises: the positive voltage input port (99), the positive voltage output port (98), the upper buss bar (601), the lower buss bar (602), the second side printed circuit board (603 in FIG. 7), the first side printed circuit board (604), the main printed circuit board (699), the relay (74), the switch (81), the light emitting diodes (56), the positive voltage input port pogo pins (605), the positive voltage output port pogo pins (606), the ground trigger port pogo pin (607), the positive voltage trigger port pogo pin (608), and a ground reference port pogo pin (609). The positive voltage input port (99) is electrically connected to the positive voltage input port pogo pins (605) via the upper buss bar (601). When two devices (100) are coupled together without the removable insulating cover (not shown) in place, their positive voltage input ports (99), positive voltage output ports (98), ground trigger ports (97), positive voltage trigger ports (96), and ground reference ports (95) become electrically connected. In this example the switch (81) is mounted directly on the main printed circuit board (699) however it shall be understood that the switch (81) may engage any part of the upper housing (500) or the lower housing (400) and may be connected to the electrical assembly using ribbon cable or other known connection method and that the invention is not limited in this respect.

The positive voltage input port (99) is electrically connected via the upper buss bar (601) to the positive voltage input port pogo pins (605) however it shall be understood that the positive voltage input port (99) may be electrically connected to the positive voltage input port pogo pins (605) using wires instead of buss bars or any number of pogo pins and that the invention is not limited in this respect.

The positive voltage output port (98) is electrically connected via the lower buss bar (602) to the positive voltage output port pogo pins (606) however it shall be understood that the positive voltage output port (98) may be electrically connected to the positive voltage output port (98) pogo pins using wires instead of buss bars or any number of pogo pins and that the invention is not limited in this respect.

The ground trigger port (97) is electrically connected to the ground trigger contact pad (not shown) and the ground trigger port pogo pin (607) via the main printed circuit board (699) and the second side printed circuit board (603) and the first side printed circuit board (604) however it shall be understood that the ground trigger port (97) may be electrically connected to the ground trigger contact pad (not shown) and the ground trigger port pogo pin (607) using wires or buss bars or ribbon cables instead of printed circuit boards and may use any number of pogo pins and that the invention is not limited in this respect.

The positive voltage trigger port (96) is electrically connected to the positive voltage trigger contact pad (not shown) and the positive voltage trigger port pogo pin (608) via the main printed circuit board (699) and the second side printed circuit board (603) and the first side printed circuit board (604) however it shall be understood that the ground trigger port (96) may be electrically connected to the positive voltage trigger contact pad (not shown) and the positive voltage trigger port pogo pin (608) using wires or buss bars or ribbon cables instead of printed circuit boards and may use any number of pogo pins and that the invention is not limited in this respect.

The ground reference port (95) is electrically connected to the ground reference contact pad (not shown) and the ground reference port pogo pin (609) via the main printed circuit board (699) and the second side printed circuit board (603) and the first side printed circuit board (604) however it shall be understood that the ground trigger port (95) may be electrically connected to the ground reference contact pad (not shown) and the ground reference port pogo pin (609) using wires or buss bars or ribbon cables instead of printed circuit boards and may use any number of pogo pins and that the invention is not limited in this respect.

The positive voltage input port (99) and the positive voltage output port (99) are shown as lugs with screw terminals but it shall be understood that these ports could also be male pins or a female socket soldered directly to the main PCB designed to engage with the vehicle wiring via an electrical connector. The ground reference port (95), the positive voltage trigger port (96) and the ground trigger port (97) are shown as a terminal block with screw terminals but it shall be understood that these ports could also be male pins or a female socket soldered directly to the main PCB designed to engage with the vehicle wiring via an electrical connector and that the invention is not limited in this respect.

In the example embodiment the relay (74) is shown as a semiconductor relay also known as a MOSFET, a type of electronic switch but it shall be understood that this component may be a different type of transistor or an electromechanical relay that switches direct current electrical power and that the invention is not limited in this respect.

Figure 10A:
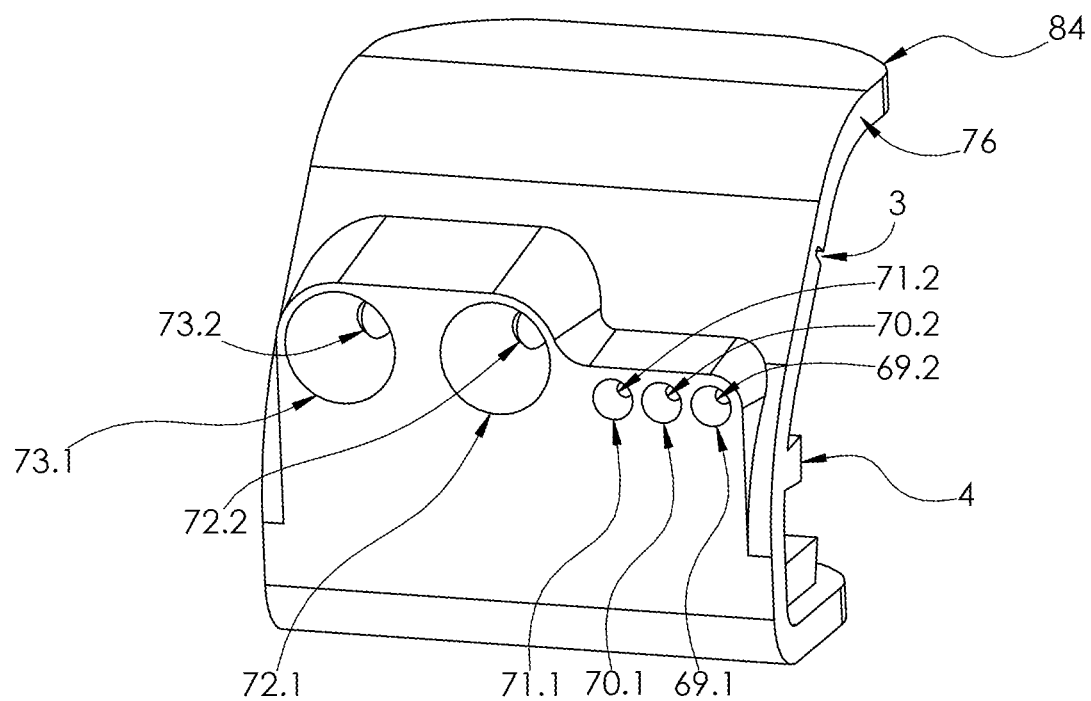
FIG. 10a is an isometric view of an example elastomeric and semi-detachable weather-resistant panel.
Figure 10B:
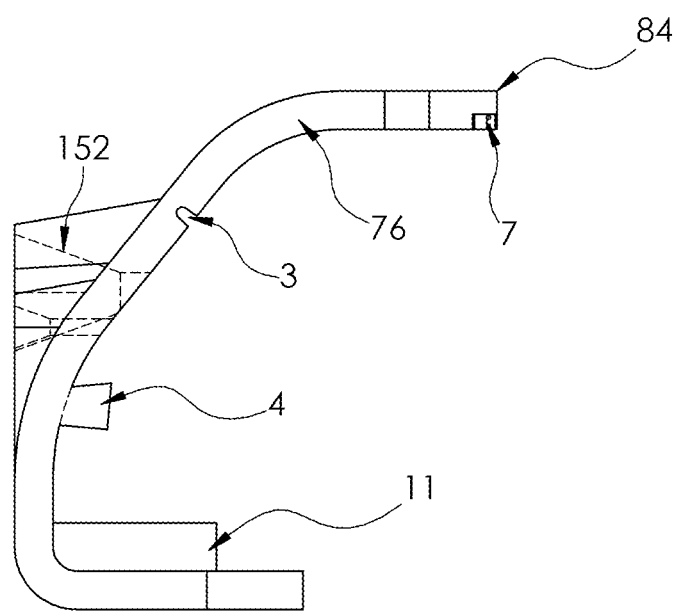
FIG. 10b is a side view of an example elastomeric and semi-detachable weather-resistant panel.

FIG. 10*a* is an isometric view of an example semi-detachable weather-resistant panel (84). In this example the panel (84) is constructed using an elastomeric material such as silicone and is configured with multiple openings. Each opening has a major diameter (69.1, 70.1, 71.1, 72.1, and 73.1) and a minor diameter (69.2, 70.2, 71.2, 72.2, and 73.2). The diameter of each opening decreases from the major diameters (69.1, 70.1, 71.1, 72.1, 73.1) to provide a seal with wiring of differing diameters. The sealing and retaining face (76) provides a sealing face for the panel (84) to create a substantially weather-resistant seal with the housings (400 and 500 in FIG. 6). FIG. 10*b* is a side view of an example semi-detachable weather-resistant panel (84) showing a decreasing internal diameter (152). Also shown is the hinge (3), the pinch protrusion (4), and the retention tab(s) (7). In this example, the decreasing internal diameter (152) is represented by a dotted line and clearly illustrates how the elastomeric panel (84) may engage with wiring of differing diameters and provide a substantially weather-resistant seal between the panel and the wiring. Larger diameter wiring will generally be used for the positive voltage supply wire (47) and the positive voltage output wire (46) so the major diameters (73.1 and 72.1) and the minor diameters (73.2 and 72.2) may be larger than the major diameters (69.1, 70.1, and 71.1) and minor diameters (69.2, 70.2, and 71.2) respectively. Although this example provides for openings of different sizes, it shall be understood that the openings in the panel (84) may be of any variation necessitated by the user or that an electrical connector may replace the use of the semi-detachable weather-resistant panel (84) altogether and that the invention is not limited in this respect. The retention tab(s) (7) are protrusions configured to removably attach the panel (84) to the upper housing (500 in FIG. 8*u*) by engaging elastomer retention slots (8 in FIG. 8) the upper housing (500 in FIG. 8). In this example, the pinch protrusion (4) is configured to be permanently retained in the slot (6 in FIG. 6) between the lower housing (400 in FIG. 5) and the upper housing (500 in FIG. 5). The pinch protrusion (4) provides for a secure method of retaining the panel (84) permanently so as to limit the movement and encourage the elastomeric material to bend at the hinge feature (3). The pinch protrusion provides a method of securing the panel (84) between the upper and lower housings which further aids in strain relief for the wiring terminations which may be pulled and strained in multiple directions.

Figure 11:
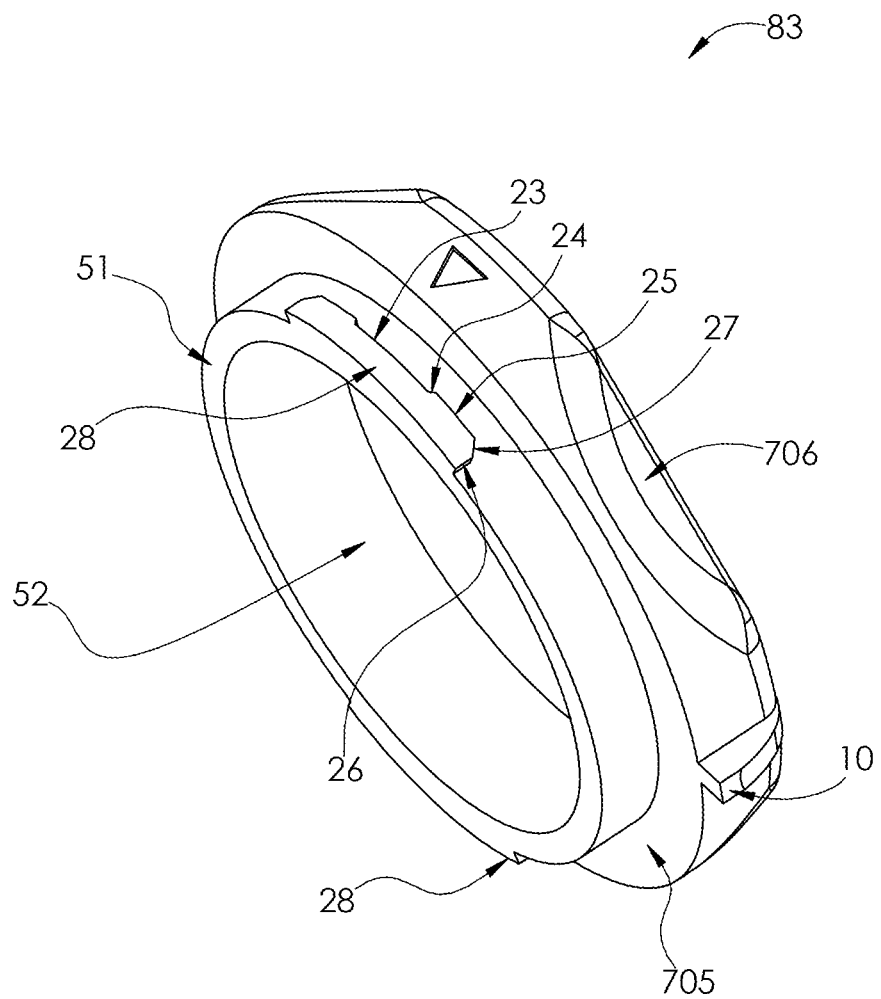
FIG. 11 is an isometric view of an example first side cover.

FIG. 11 is an isometric view of an example first side cover (83) having an opening (52) a sealing face (51). The first side cover (83) is typically inserted into the first side housing opening (451 in FIG. 6) such that the first side cover interlocking features (28) are offset from the first side interlocking features (88 in FIG. 3), the sealing face (51) engages the first side mechanical sealing element (48 in FIG. 3) and pressure is applied to compress the sealing element (48 in FIG. 3), once the mating face (705) is flush with the first side of the device (501 in FIG. 3) the first side cover (83) can be rotated along the axis of rotation (55 in FIG. 18) and the first side cover interlocking features (28) will engage with the first side interlocking features (88 in FIG. 3) and secure the first side cover (83) to the first side of the device (501 in FIG. 3). The locking features (28) illustrate that coupling may be completed in either the clockwise or counter-clockwise direction as evidenced by the first side cover interlocking feature engagement ramps (27) located on either side of the interlocking feature (28). The finger detent(s) (706) aid in gripping and rotating the first side cover (83).

Figure 12:
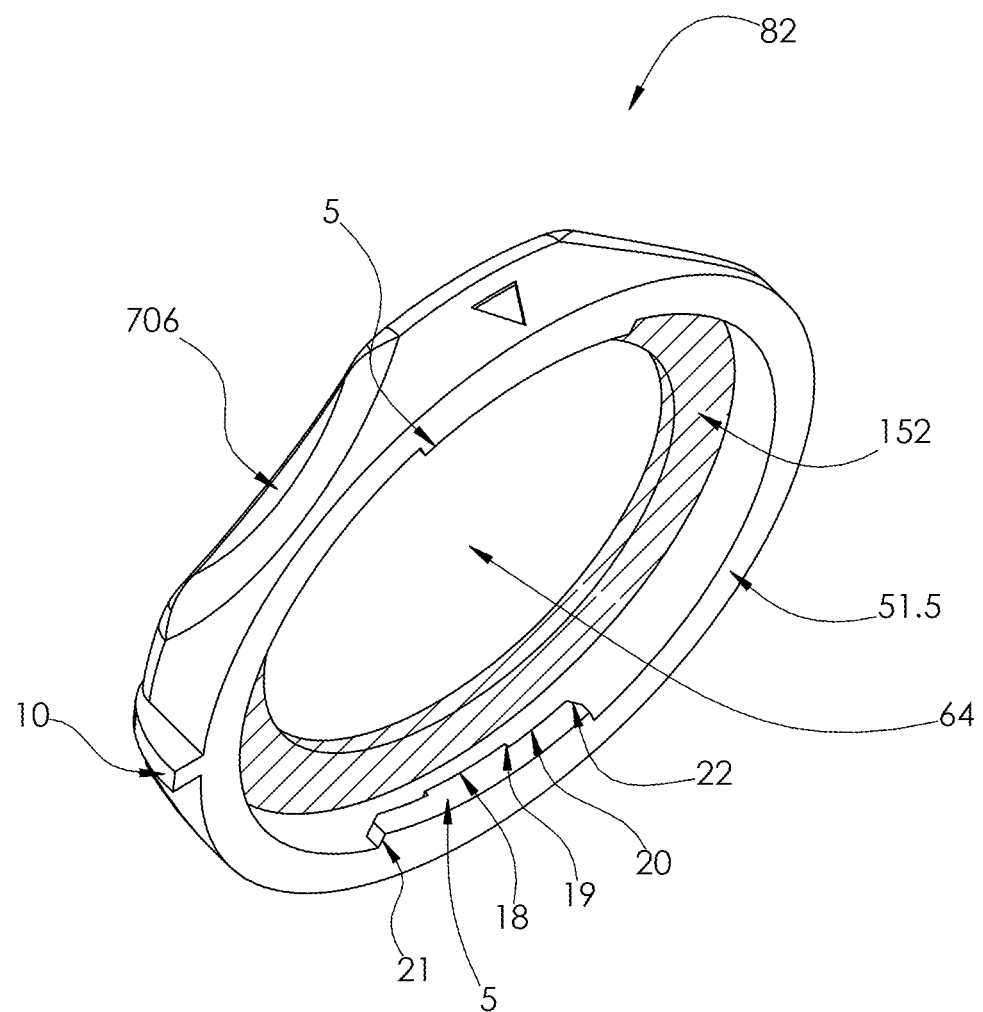
FIG. 12 is an isometric view of an example second side cover.

FIG. 12 is an isometric view of an example second side cover (82) having an opening (64). The opening (64) in the second side cover (82) is typically slid over the second side connector (151 in FIG. 4) such that the second side cover interlocking features (5) are offset from the second side interlocking features (89), the second side cover mechanical sealing element (152) engages the second side sealing face (707 in FIG. 4) and pressure is applied to compress the sealing element (152), once the mating face (51.5) is flush with the second side of the device (502 in FIG. 4) the second side cover (82) can be rotated along the axis of rotation (55 in FIG. 18) and the second side cover interlocking features (5) will engage with the second side interlocking features (89 in FIG. 4) and secure the second side cover (82) to the second side of the device (502 in FIG. 4). The locking features (5) illustrate that coupling may be completed in either the clockwise or counter-clockwise direction as evidenced by the second side cover interlocking feature engagement ramps (22) located on either side of the interlocking features (5). The finger detent(s) (706) aid in gripping and rotating the second side cover (82).

Figure 13:
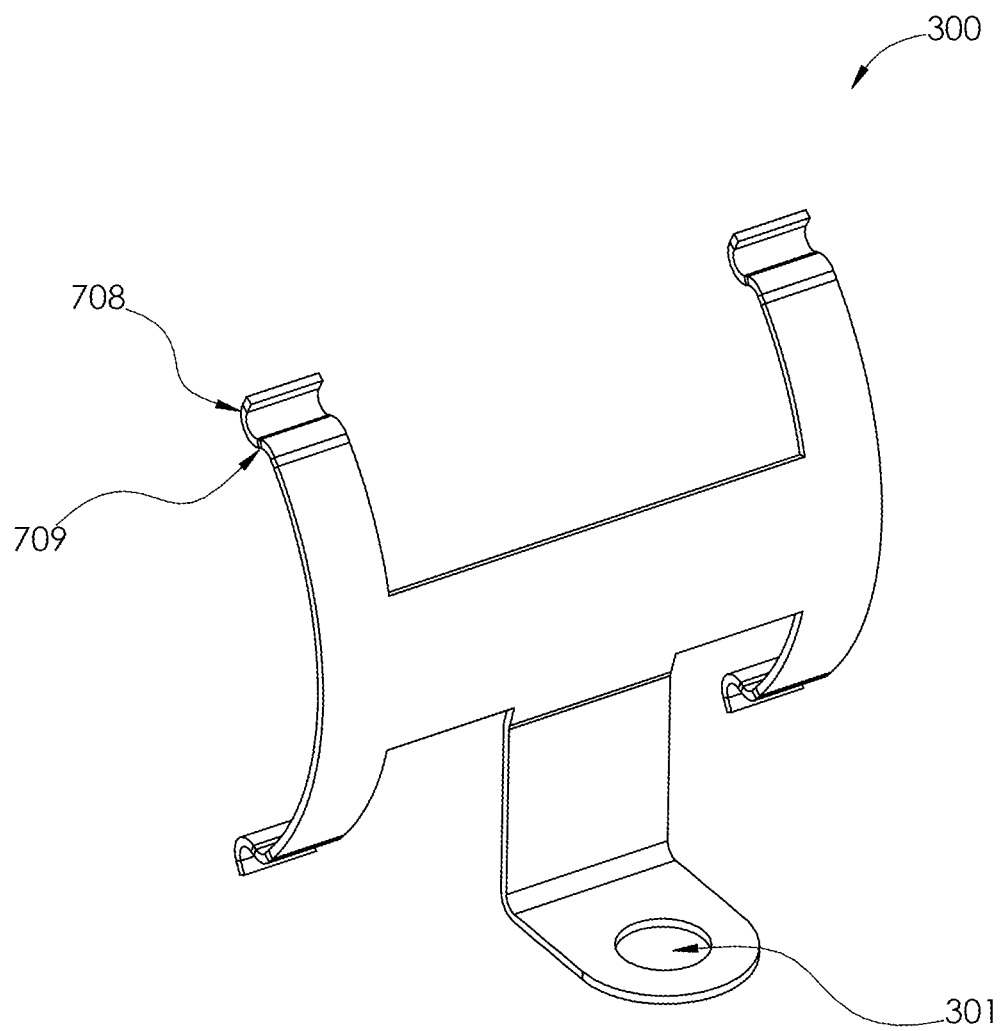
FIG. 13 is an isometric view of an example mounting bracket.

FIG. 13 is an isometric view of a mounting bracket (300). In this example the mounting bracket (300) has a mounting hole (301) that is typically mounted to a vehicle with a fastener such as a bolt, a screw, or a zip-tie and may be mounted to a flat substrate or any other part of the vehicle such as the wiring harness, the roll bar, the fender, the firewall, the floor pan, etc. The mounting bracket (300) is constructed from a formed piece of spring steel and configured to engage retention slots (711 in FIG. 14a) in the upper and lower housing. Typically the mounting bracket (300) engages the retention slots (711 in FIG. 14a) first with the engagement ramp features (708) and which deflect until the retention ramp features (709) can engage the retention slots in the housing (not shown). In another example the mounting bracket (300) may engage a heatsink extending from the internal cavity of the housing.

Figure 14A:
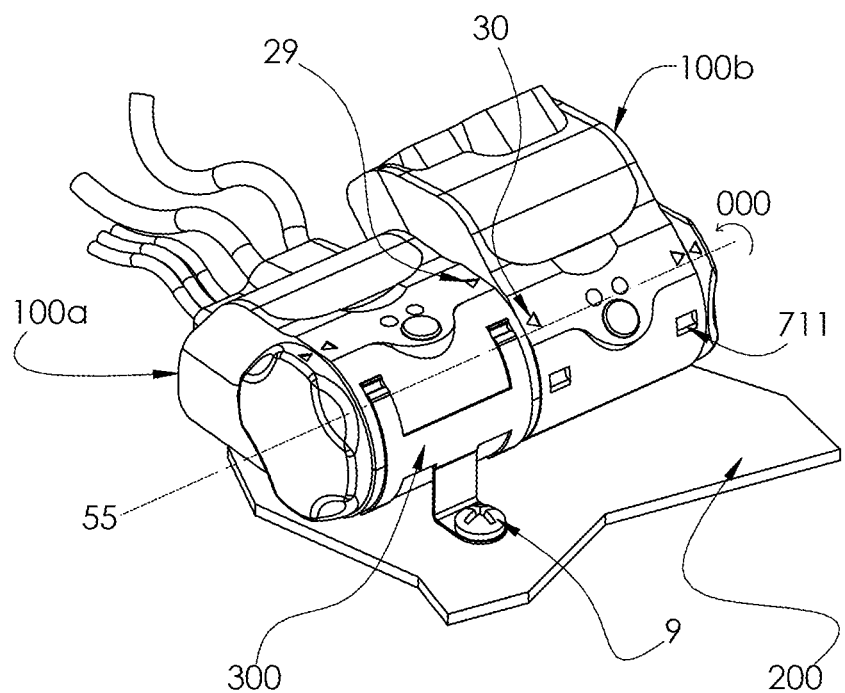
FIG. 14a is an isometric view of a device being coupled to the left side of a mounted device.
Figure 14B:
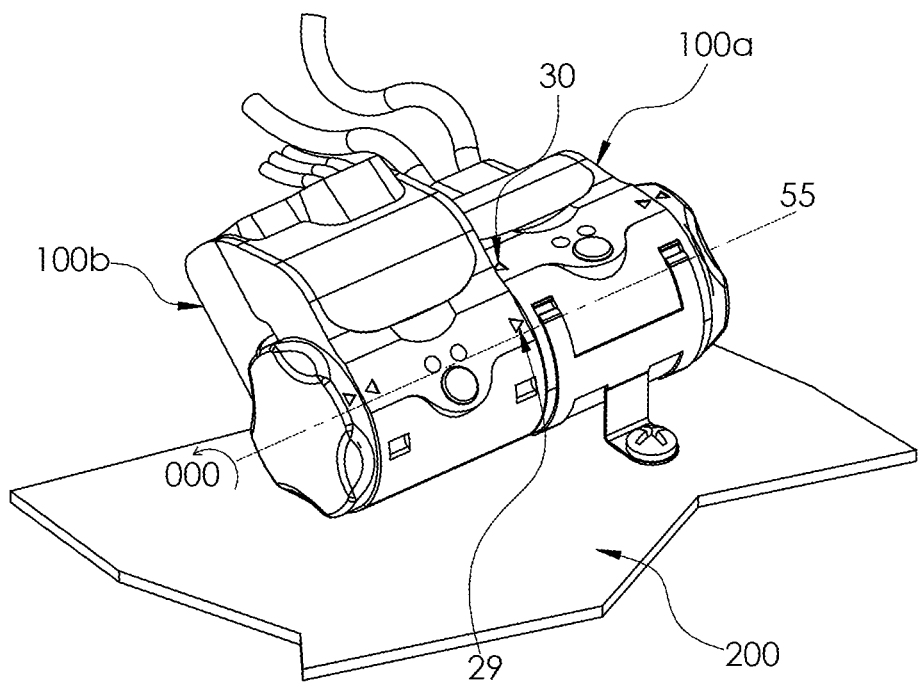
FIG. 14b is an isometric view of a device being coupled to the right side of a mounted device.

FIG. 14a-b is a rear isometric view illustrating how two exemplary devices may be coupled together. In the example shown, subsequent device (100b) couples to an adjacent preceding device (100a) which is mounted to a substrate (200). The subsequent device (100b) is shown in the engaged but non-interlocked position and must rotate in the rotation direction (000) to engage mechanically with the preceding device (100a). The preceding device is removably attached to an exemplary mounting bracket (300) which is mounted to a substrate (200) using a screw (9) extending through the mounting hole (301 in FIG. 13) in the mounting bracket (300). The subsequent device (100b) engages the preceding device and then rotates about the axis of rotation (55) to engage the interlocking features disposed on the second side of the preceding device (88) with the interlocking features on the first side of the subsequent device, however it shall be understood that devices (100a)(100b) may couple in any number of different ways including sliding connectors, straight-plug connectors, bayonet mount, male/female pin engagement, latching mechanisms, locking tabs, and any other method or system of attaching devices (100a)(100b) together mechanically and electrically, and that the invention is not limited in this respect.

In this example, a mounting bracket (300) is removed from the device (100b) allowing that device to rotatably couple to the preceding device (100a) without breaking the plane of the flat substrate (200). The mounting bracket (300) can then be attached to the device (100b) once the device (100b) is coupled to an adjacent device as indicated by the alignment of the position indicators (29, 30). In this example a mounting bracket (300) removably attaches to each device (100a, 100b).

This example clearly illustrates the retention slot(s) (711) are designed to allow the mounting bracket (300) to removably attach to the housing (499) of the device(s) (100a, 100b). In this way any device (100) may be removed from it's mounting bracket (300) while the mounting bracket (300) remains attached to the vehicle.

Figure 15:
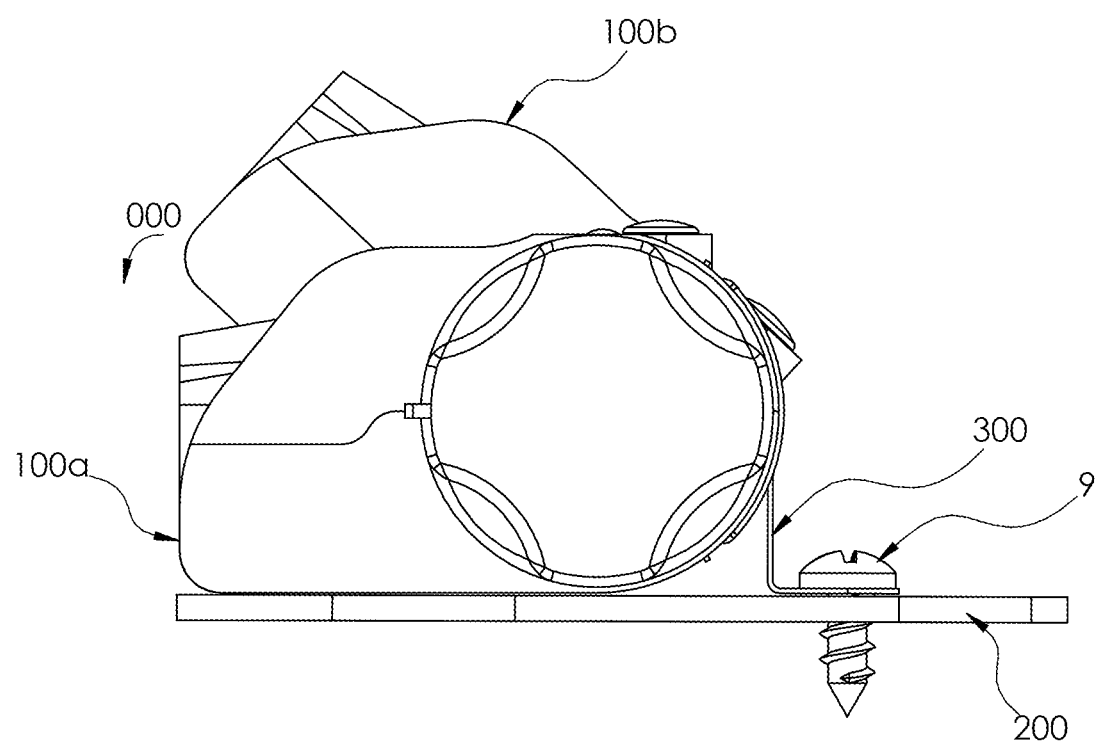
FIG. 15 is a right side view of two devices illustrating an example method of coupling devices together.

FIG. 15 shows a right side view of how two exemplary devices (100a, 100b) may be coupled together by first engaging and then rotating. Adjacent devices couple together electrically and mechanically within a weather-resistant seal (48 in FIG. 5). The exemplary device (100a) has a second side connector on the left side of the device comprising electrical and mechanical contacts configured to engage a first side connector on the right side of an immediately adjacent device (100b).

Figure 16:
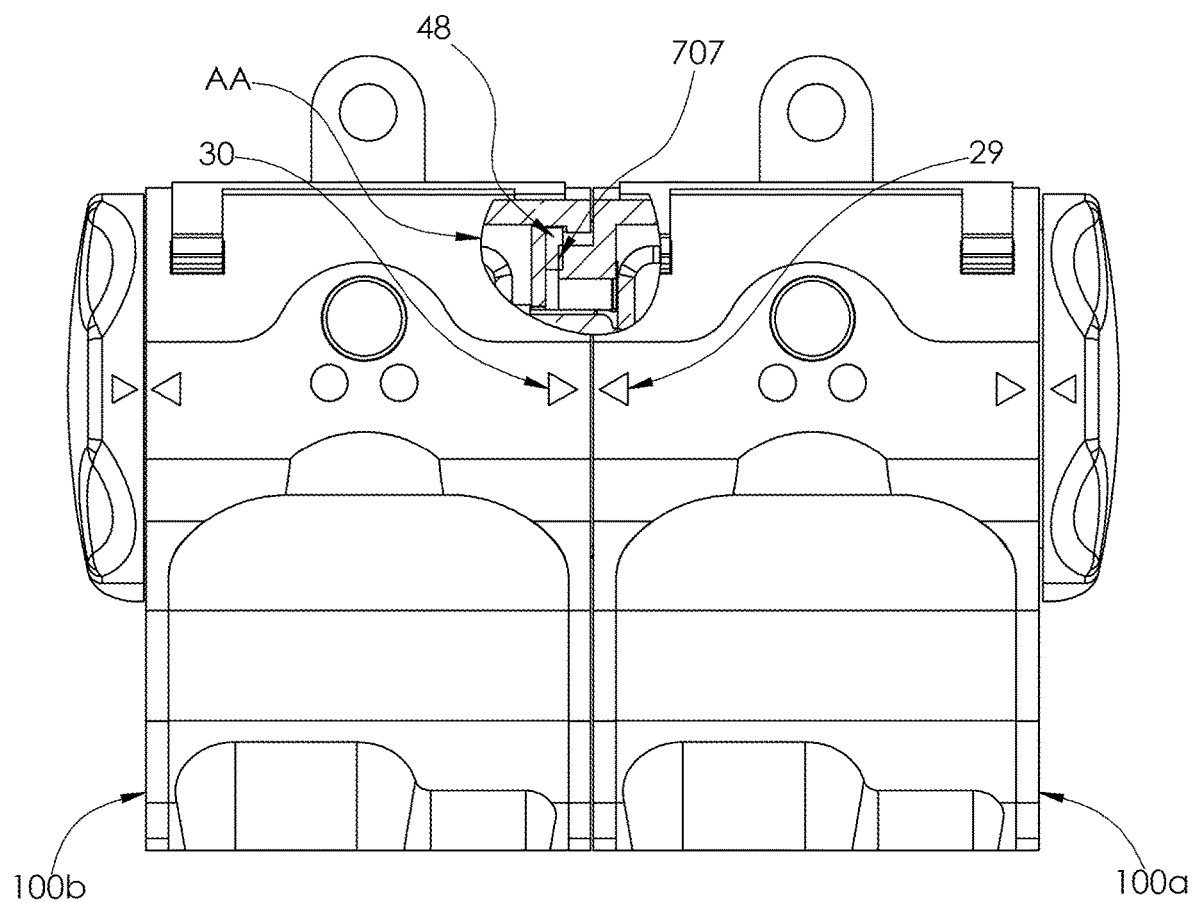
FIG. 16 is a top view of two example devices in the engaged and interlocked position, with a cross-sectional window view.

FIG. 16 shows how exemplary devices (100a, 100b) may be coupled together. The illustration provides a cross-sectional view of an example second side sealing face engaging a first side mechanical sealing element. Specifically how the left side of a device (100a) may be coupled to the right side of a device (100b) with the wiring connections at a perpendicular angle. However it shall be understood that aspects of the invention are applicable to coupling of devices from the top or bottom as well as the left and the right and while this example uses a rotational interlocking connection method, it shall be understood that other connection methods such as sliding connectors, straight-plug connectors, bayonet mount, male/female pin engagement, latching mechanisms, locking tabs, and any other method or system of coupling may be used. In this example the second side sealing face (707) is shown engaging the first side mechanical sealing element (48) when the devices (100a, 100b) are coupled together. In this example, position indicators (29, 30) provide indication that the adjacent devices (100a, 100b) are fully interlocked. When the position indicators (29, 30) align, the adjacent devices are fully interlocked and coupled together. In this position the electrical contacts disposed on the first side of device (100b) are aligned with the electrical contacts disposed on the second side of device (100a).

Figure 17:
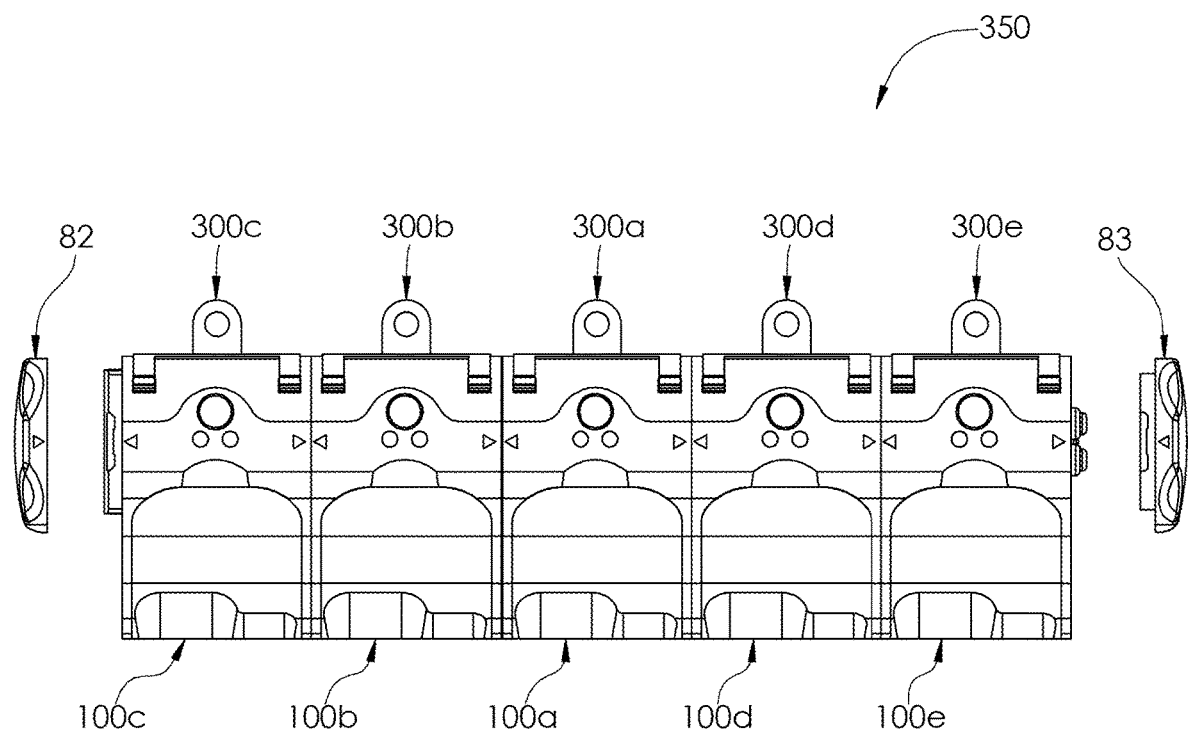
FIG. 17 is a top view of an example modular system of devices.

FIG. 17 shows a top view of an example modular system of devices (350) coupled together as they may appear in a vehicle. Each device (100a, 100b, 100c, 100d, 100e) may be attached to a mounting bracket (300a, 300b, 300c, 300d, 300e) that is attached to the vehicle (not shown) while subsequent device(s) (100a-100e) are coupled to the preceding device(s). Each device (100a-100e) includes a first side connector designed to engage a second side connector of an adjacent device, and a second side connector designed to engage a first side connector of an adjacent device. The devices (100a-100e) engage a mechanical sealing element (48) that provides weather-resistance when they are coupled together. In this example, the outer-most devices (100c, 100e) may engage covers (82, 83) respectively, to provide weather-resistance to the electrical contacts disposed on the outer-most sides.

Each device (100a-100e) in the modular system of devices (350) may house a relay, and although devices shown in this example houses a semiconductor relay (74 in FIG. 9) also known as a solid state relay, a type of electronic switch, it shall be understood that aspects of the invention are applicable to an electromechanical relay as well, and that the invention is not limited in this respect. The modular system of devices (350) is typically mounted to a substrate on a vehicle such as a firewall, floorboard or mounting plate but may also be attached to a wiring harness, or to any other part of a vehicle.

In this example the devices may function differently if an insulating cover (not shown) is in place. If there's not an insulating cover in place between (100*c*) and (100*b*) then those devices would function as one, larger capacity single output device. In the described configuration, a trigger wire from either device (100*c*, 100*b*) will activate the output on either device (100*c*, 100*b*). In an alternate configuration, an insulating cover is in place between devices (100*c*) and (100*b*), selectively insulating the output contacts, and the trigger contacts between adjacent devices. In this configuration only positive voltage supply and ground reference contacts are electrically communicated between devices and each device (100*c*, 100*b*) is triggered on independent of the other.

In another configuration, if there is an insulating cover between 100*b* and 100*a*, between 100*a* and 100*d* and between 100*d* and 100*e* then there would be four total outputs: one increased ampacity output using devices (100*b*) and (100*c*) and three standard ampacity outputs using devices (100*a*, 100*d*, 100*e*). If a user uncoupled (100*c*) from (100*b*) and removed the insulating cover between them and then coupled them together again then the system pictured would be five total outputs, all with standard output ampacity. If a user replaced the removable cover (83) with a removable cover with a receiver/transceiver and microcontroller (such as 650 from FIG. 19 or 651 from FIG. 20) then 100*e* would become controllable via communications sent to the receiver and carried out by the microcontroller.

Figure 18:
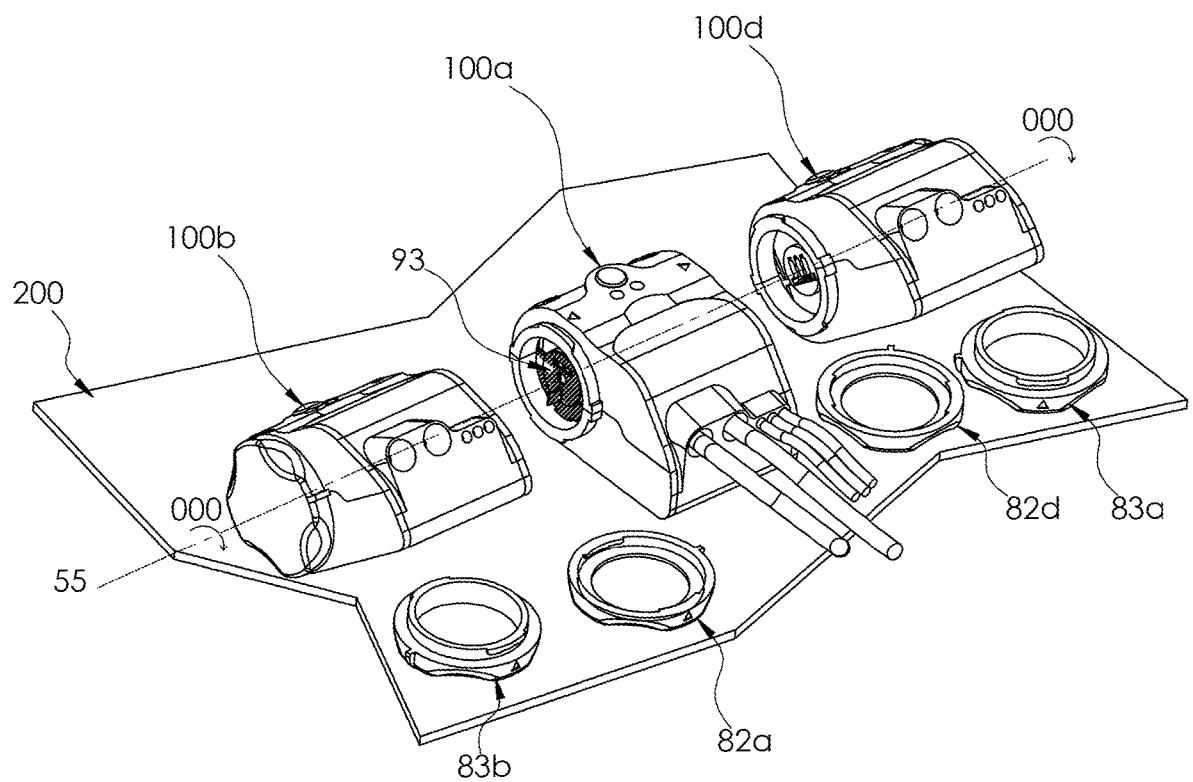
FIG. 18 is an isometric view illustrating an example method of coupling devices together.

FIG. 18 is an isometric view of three example devices (100*a*, 100*b*, 100*d*) arranged along the axis of rotation (55) in the non-engaged, non-interlocked position. This example illustrates how subsequent devices (100*b*, 100*d*) may be coupled to the left side or the right side of a preceding device (100*a*). In this example, the devices (100*b*, 100*d*) are oriented in a position along the axis of rotation (55) that they may engage with the device (100*a*) by translating toward device (100*a*) along the axis of rotation (55) until the devices engage each other. Once engaged, the devices (100*b*, 100*d*) may be rotated along the axis of rotation (55) in the rotation direction (000) until they are fully engaged and interlocked. In this example the device (100*a*) is mounted to a substrate (200) and connected to wiring. The removable insulating cover (93) is in place on the second side of the device (100*a*) selectively insulating electrical contacts between devices (100*a*) and (100*b*). The insulating cover (93) is absent from the second side of the device (100*d*) so all electrical contacts will be shared between devices (100*a*) and (100*d*). In the described configuration, device (100*a*) will only share positive voltage supply and ground reference with device (100*b*) because the insulating cover (93) will insulate the trigger and output contacts. The device (100*a*) will share all electrical contacts with device (100*d*) because the insulating cover (93) has been removed. The described configuration will provide two outputs: device (100*a*) and (100*d*) will function as one device with increased ampacity, sharing the electrical load between them; device (100*a*) and (100*b*) will function as independent devices sharing only positive voltage supply and ground reference.

In this example five wires are shown entering the device (100*a*) although the most common use case will use only four wires because either a ground trigger wire (44) or a power trigger wire (45) will be used and in most cases not both. In the case where an opening in the panel (84) is not engaged with a wire (44 or 45) a cavity plug may be used to provide a substantially weather-resistant seal for the electrical contacts (95-99 in FIG. 9). This example also shows the side covers (83*b*, 82*a*, 82*d*, 83*a*) that would remain after coupling devices together in this manner.

Figure 19:
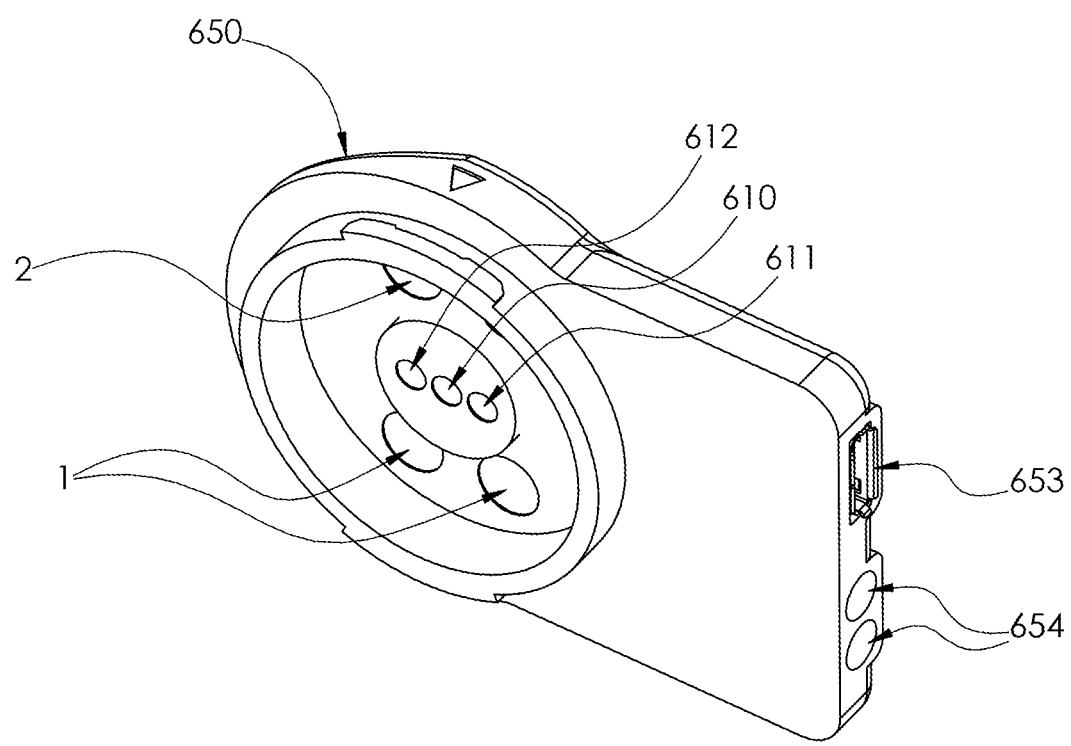
FIG. 19 is an isometric view of an example side cover containing a wired communications receiver/transceiver and microcontroller.

FIG. 19 is an isometric view of an example side cover (650) containing a wired communications receiver/transceiver and a microcontroller in a housing that engages electrically and mechanically with the first side of an exemplary device. The cover is configured to engage the electrical contacts disposed on the first side of a device. The microcontroller contained within the side cover (650) may be configured to trigger the device by means of electrical contact using the positive voltage trigger port contact pad (612) acting on the positive voltage trigger pogo pin, or the ground trigger port contact pad (611) acting on the ground trigger pogo pin. Power and ground for the electronics within the side cover (650) is provided from the electrical contacts disposed on the first side of the device communicated by the interface of the positive voltage input pogo pins with the positive voltage input port contact pad (2), and the ground reference pogo pin with the ground reference port contact pad (610). Output state may be communicated to the electronics inside the side cover (650) by the interface of the positive voltage output pogo pins with the positive voltage output port contact pad (1).

The side cover (650) may also contain a programming connector (653) and a communications connector (654). The programming connector (653) may be used to program the microcontroller inside the side cover (650) to activate the device based on communications. These conditions may be configured by the user of the device, the manufacturer, reseller, etc. In the example shown the programming connector (653) is shown as a micro USB connector although it may be any type of electrical connector that facilitates programming. The communications connector (654) may be used to connect the side cover (650) to a communications network. In the example shown the communications connector (654) is represented as open wiring ports although it may be any type of electrical connector that can connect the electronics inside the side cover (650) to wiring from a communications network or external device.

The side cover (650) may be coupled to a device while the device remains mounted to a substrate and connected to wiring. In this way the side cover (650) may add immediate functionality to the device and allow it to act independent of an external controller. The network communications transceiver shown uses two wires for communication, however it shall be understood that any number of wires may be used to provide communications to the cover (650). Furthermore, although the housing is shown engaging the first side of the device, it shall be understood that the housing may engage any side of the device and that the invention is not limited in this respect.

Figure 20:
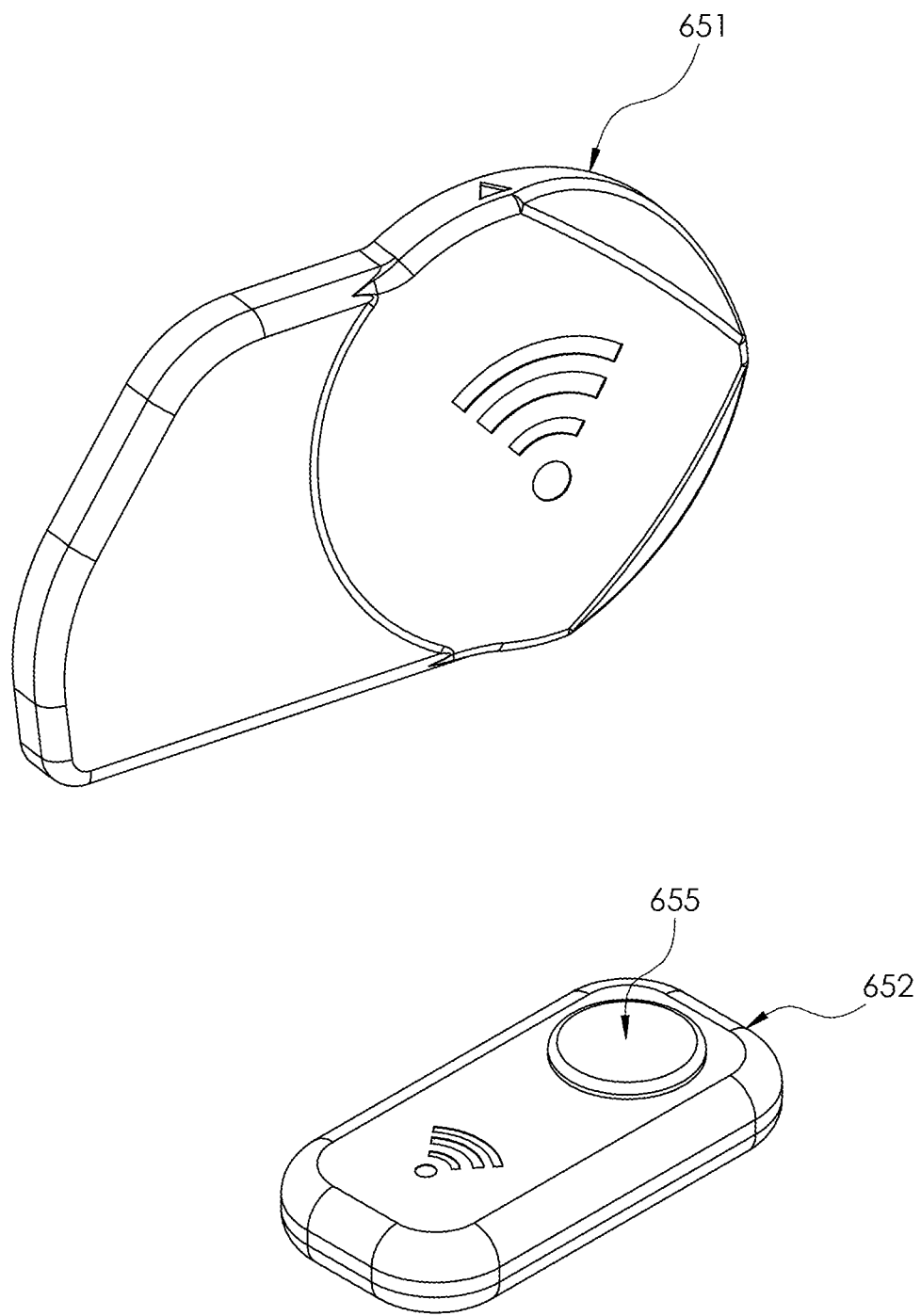
FIG. 20 is an isometric view of an example side cover containing a wireless communications receiver and microcontroller and an example wireless remote controller.

FIG. 20 is an isometric view of an example side cover (651) and a wireless remote (652). The side cover (651) containing a wireless communications receiver and a microcontroller in a housing that engages electrically and mechanically with the first side of an exemplary device. In this example a wireless remote (652) with a button (655) may be used to activate and deactivate the device in which the side cover (651) is coupled to. The cover is configured to engage the electrical contacts disposed on the first side of a device. The microcontroller contained within the side cover (651) may be configured to trigger the device by means of electrical contact using the positive voltage trigger port contact pad (612) acting on the positive voltage trigger pogo pin, or the ground trigger port contact pad (611) acting on the ground trigger pogo pin. Power and ground for the electronics within the side cover (651) is provided from the electrical contacts disposed on the first side of the device communicated by the interface of the positive voltage input pogo pins with the positive voltage input port contact pad (2), and the ground reference pogo pin with the ground reference port contact pad (610). Output state may be communicated to the electronics inside the side cover (651) by the interface of the positive voltage output pogo pins with the positive voltage output port contact pad (1). Although the housing is shown engaging the first side of the device, it shall be understood that the housing may engage any side of the device and that the invention is not limited in this respect. Furthermore, it shall be understood that communications may be wireless and use any number of communication protocols such as radio frequency, WiFi, Bluetooth and others and that the wireless communications may be provided from a wireless remote similar to (652) or any other external device and that the invention is not limited in this respect.

Figure 21:
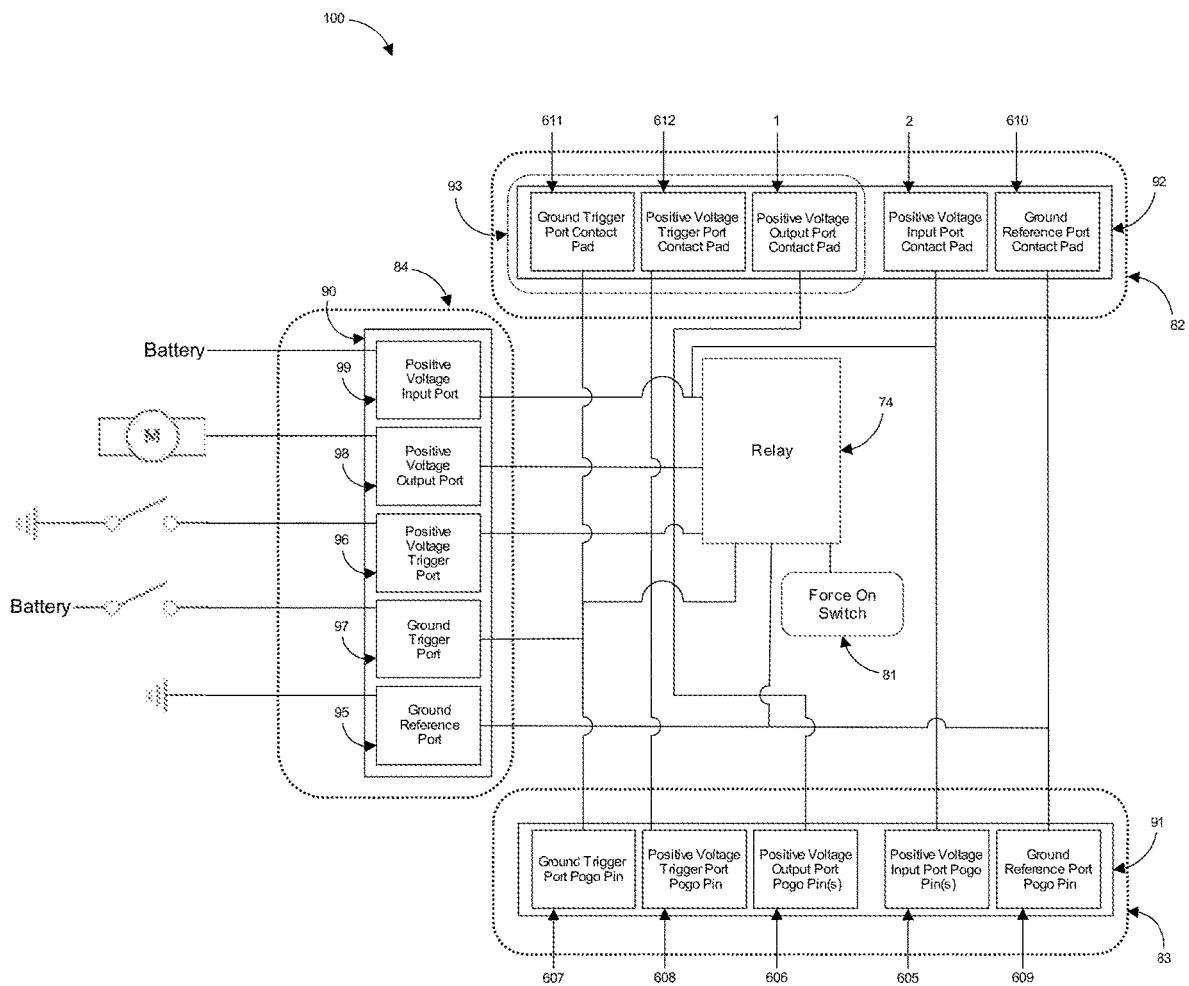
FIG. 21 is a functional block diagram of an example device.

FIG. 21 shows a block diagram of the present embodiment of the invention. In FIG. 21 the device (100) comprises of front ports (90), second side ports (92) and first side ports (91). The front ports consist of a positive voltage input port (99), a positive voltage output port (98), a ground trigger port (97), a positive voltage trigger port (96), a ground reference port (95). The second side ports (92) and first side ports (91) are electrically connected to the front ports (90) of the same name. In this way, additional devices can be coupled to the left and the right side of a device with plurality and share the electrical signals from the front ports (90) to the second side ports (92) and first side ports (91). The front ports are intended to connect to the wiring harness and are located behind a semi-detachable weather-resistant panel (84) that is made from elastomeric material. The wiring must pass through the semi-detachable weather-resistant panel (84) to connect to the front ports (90). The second side ports (92) are located behind the second side cover (82) on the second side of the device (502) and are intended to interface with the first side ports (91) of an adjacent device. The second side cover (82) must be removed in order to couple an adjacent device to the second side. The first side ports (91) are located behind the first side cover (83) on the right side of the device (100) and are intended to interface with the second side ports (92) of an additional device (100). The first side cover (83) must be removed in order to couple an adjacent device to the first side. With the addition of the removable insulating cover (93), the second side ports (611, 612, and 1) are insulated so when an adjacent device is coupled to the second side these select contacts are electrically insulated from each other and electricity is not allowed to flow between the insulated contacts of the adjacent coupled devices. When the removable insulating cover (93) is removed and a subsequent device is coupled to the second side of a device, all five ports (611, 612, 1, 2, and 610) on the second side are shared electrically to the adjacent device. In the preferred embodiment, each of the ports (99, 98, 97, 96, and 95) are connected to the relay (74) inside the device (100). The relay (74) electrically connects the positive voltage input port (99) to the positive voltage output port (98) when triggered on. The device can be triggered on if the ground trigger port (97) is connected to ground, or if the positive voltage trigger port (96) is connected to battery positive, or if the force on switch (81) is closed.

Although specific embodiments of a power distribution system have been shown and described, it shall be understood that other embodiments could be substituted therefore without departing from the scope of the present invention.

Figure 22:
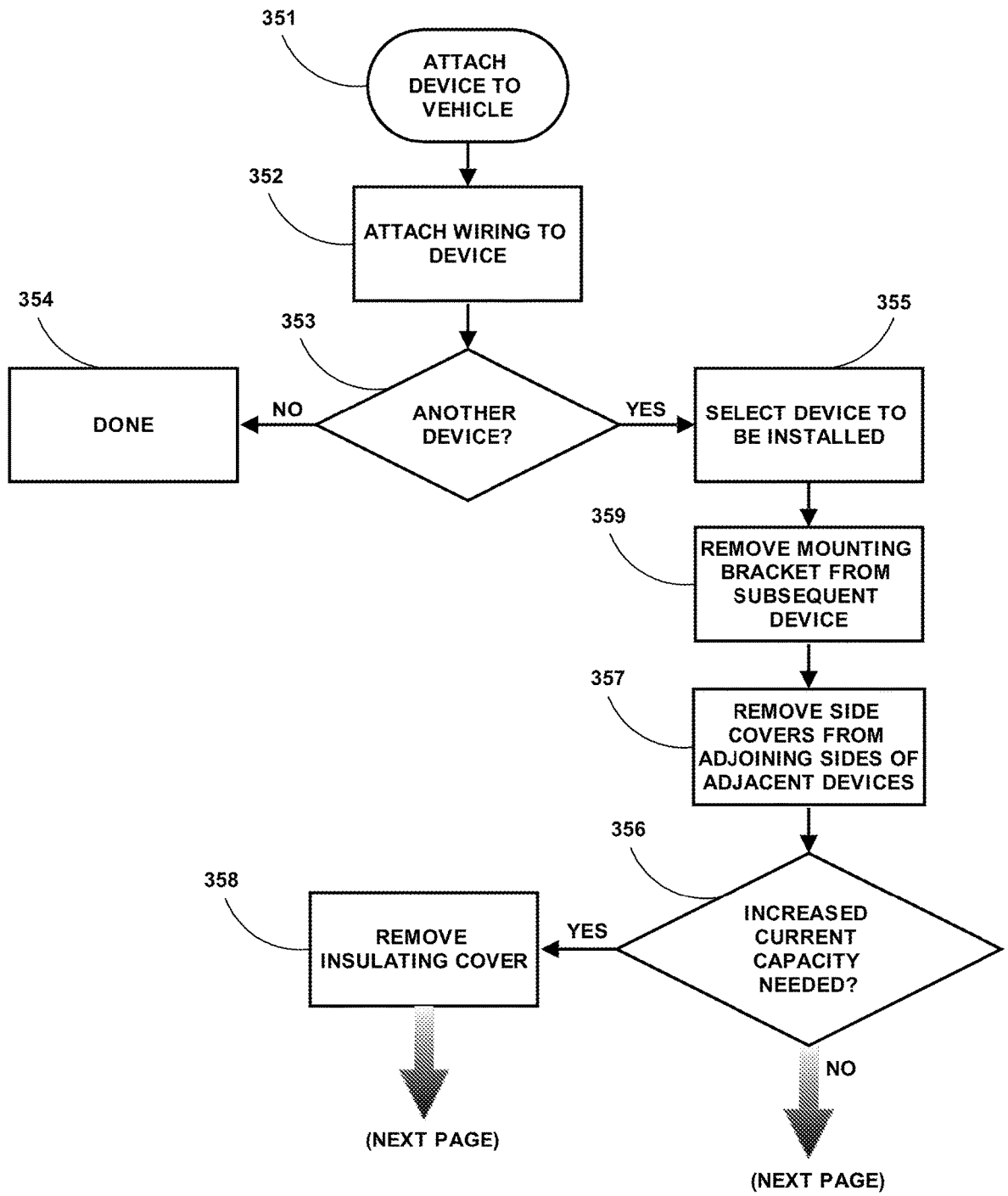
FIGS. 22 and 23 is a flow diagram illustrating an example technique for attaching devices to a vehicle and together.
Figure 23:
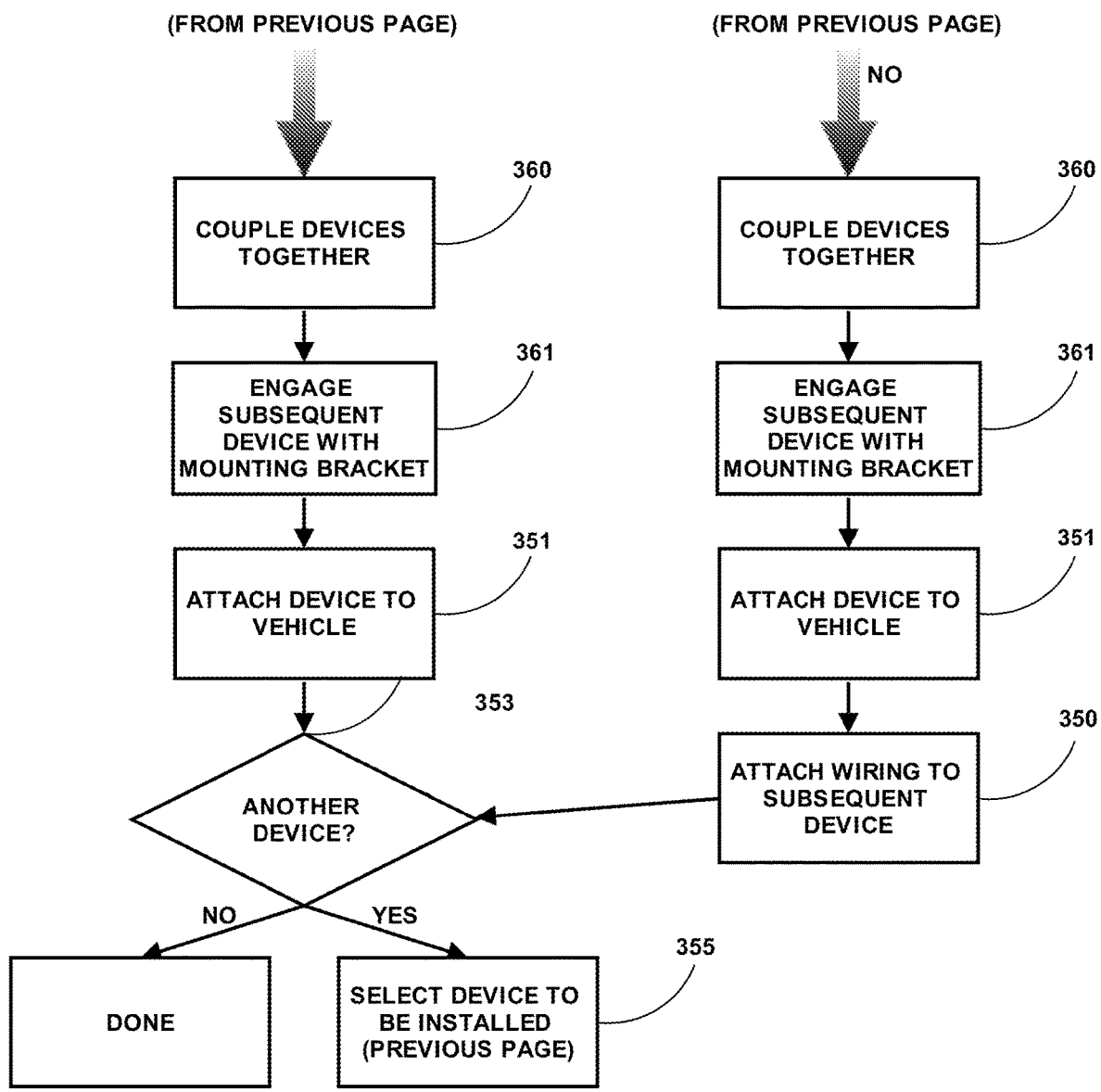

FIGS. 22 and 23 is a flow diagram illustrating an example process for coupling one or more devices (100) together and attaching them to a vehicle (not shown). A user acquires a device (100) and attaches it to a vehicle (351) by placing a fastener through the opening in the mounting bracket such as a bolt, a screw, a nut, a rivet, a zip-tie, or any other fastener that is appropriate, and attaching that fastener to the vehicle. Next, the user attaches the appropriate wiring to the device (352). If another device is to be installed (353), the user selects the device to be installed (355) and removes the mounting bracket from the subsequent device (359), then removes the side covers from the adjoining sides of the adjacent devices (357). The user then determines if increased current capacity is needed (356) for the apparatus being switched on by the device (100). The apparatus being a fan, a pump, a motor, lighting, or any other apparatus powered by direct current electricity. If the user is instead switching on a second apparatus with the selected device (100) where the current capacity of a single device (100) is adequate then the user couples the devices together (360) while the preceding device remains attached to a substrate. Once the devices are coupled together the mounting bracket may be reattached to the subsequent device (361) and the device may be attached to the vehicle (351) as before. Next, the user attaches the appropriate wiring to the subsequent device (350). If increased current capacity was needed (356) then the user must remove the insulating cover (358) disposed on the second side of the subsequent device (100) allowing all of the electrical contacts to be shared between the coupled devices. The user then couples the devices together (360) while the preceding device remains attached to a substrate. Once the devices are coupled together the mounting bracket may be reattached to the subsequent device (361) and the device may be attached to the vehicle (351) as before. The installation process is repeated with each subsequent device until all devices have been installed in the system (10).

What is claimed is:

1. A direct current modular power distribution device, comprising:
   a housing having at least three sides;
   an electrical assembly;
   wherein the electrical assembly comprises multiple electronic components comprising a switching circuit for connecting an external DC power source to a load;
   wherein the housing substantially encloses the electrical assembly;
   wherein the electrical assembly has electrical contacts disposed on the first and second and third side of the housing;
   wherein the electrical contacts on the third side are configured to engage with unterminated stranded wires, said wires provide connection to a load via the switching circuit;
   wherein a connector is disposed on the first side of the device, sized to directly connect electrically and mechanically with a second side of an immediately adjacent device without a common apparatus;
   wherein a connector is disposed on the second side of the device, sized to directly connect electrically and mechanically with a first side of an immediately adjacent device without a common apparatus.

2. The device of claim 1 having a first side cover wherein the first side cover attaches to the connector disposed on the first side of the housing, enclosing the electrical contacts disposed on the first side of the device between the first side cover and the housing.

3. The device of claim 1 having a second side cover wherein the second side cover attaches to the connector disposed on the second side of the housing, enclosing the the electrical contacts disposed on the second side of the device between the second side cover and the housing.

4. The device of claim 1 having a first or second side cover wherein said cover contains a communications receiver or transceiver and a microcontroller attached to a printed circuit board, wherein the printed circuit board interfaces with the electrical contacts of the side of the electrical assembly and the microcontroller can be programmed to control components of the electrical assembly based on communications received via transmission wires.

5. The device of claim 1 having a first or second side cover wherein said cover contains a communications receiver or transceiver and a microcontroller attached to a printed circuit board, wherein the printed circuit board interfaces with the electrical contacts of the side of the electrical assembly and the microcontroller can be programmed to control components of the electrical assembly based on communications received via wireless transmission.

6. The device of claim 1 wherein a third side of the housing is configured to engage an electrical connector requiring crimped or soldered electrical pins.

7. The device of claim 1 wherein a third side of the housing is configured to engage a semi-detachable elastomer panel with openings sized to form a substantially weather-resistant seal with wires of one or more size, said panel having a perimeter that engages with the housing to form a substantially weather-resistant seal, the semi-detachable elastomer panel further enclosing said electrical contacts between the housing and the panel.

8. The device of claim 1 wherein a mounting bracket attaches to the device in such a way that the device may be removed from the mounting bracket while the mounting bracket is attached to a substrate.

9. The device of claim 1 wherein an insulating cover attaches to a first or second side connector and insulates selected electrical contacts on the side in which it is attached while still allowing the connector to directly connect to an immediately adjacent device on either side.

10. A system of direct current modular power distribution devices, comprising:
a plurality of power distribution devices, arranged linearly, each attached to individual and removable mounting brackets attached to a substrate, each configured to attach to either side of a preceding device, without requiring the removal of the preceding device(s) from the substrate;
each device further including:
a housing having at least three sides;
an electrical assembly;
wherein the electrical assembly comprises multiple electronic components comprising a switching circuit for connecting an external DC power source to a load;
wherein the housing substantially encloses the electrical assembly;

wherein the electrical assembly has electrical contacts disposed on a first and second and third side of the housing;
wherein the electrical contacts on the third side are configured to engage with unterminated stranded wires, said wires provide connection to a load via the switching circuit;
wherein a connector is disposed on the first side of the device, sized to directly connect electrically and mechanically with a second side of an immediately adjacent device without a common apparatus;
wherein a connector is disposed on the second side of the device, sized to directly connect electrically and mechanically with a first side of an immediately adjacent device without a common apparatus;
wherein electrical power is shared among coupled devices.

11. The system of claim 10 having a first or second side cover wherein said cover contains a communications receiver or transceiver and a microcontroller attached to a printed circuit board, wherein the printed circuit board interfaces with the electrical contacts of the side of the electrical assembly and the microcontroller can be programmed to control components of the electrical assembly based on communications received via transmission wires.

12. The system of claim 10 having a first or second side cover wherein said cover contains a network communications receiver or transceiver and a microcontroller attached to a printed circuit board, wherein the printed circuit board interfaces with the electrical contacts of the side of the electrical assembly and the microcontroller can be programmed to control components of the electrical assembly based on communications received via wireless transmission.

13. The system of claim 10 wherein the third side of the housing is configured to engage an electrical connector requiring crimped or soldered electrical pins.

14. The system of claim 10 wherein the third side of the housing is configured to engage a semi-detachable elastomer panel with openings sized to form a substantially weather-resistant seal with wires of one or more size, said panel having a perimeter that engages with the housing to form a substantially weather-resistant seal, the semi-detachable elastomer panel further enclosing said electrical contacts between the housing and the panel.

15. The system of claim 10 wherein an insulating cover attaches to a first or second side connector and insulates selected electrical contacts on the side in which it is attached while still allowing the connector to directly connect to an immediately adjacent device on either side.

16. A method of operating a direct current modular power distribution device, comprising:
attaching a removable mounting bracket to a device comprising;
a housing having at least three sides;
an electrical assembly;
wherein the electrical assembly comprises multiple electronic components comprising a switching circuit for connecting an external DC power source to a load;
wherein the housing substantially encloses the electrical assembly;
wherein the electrical assembly has electrical contacts disposed on the first and second and third side of the housing;

wherein the electrical contacts on the third side are configured to engage with unterminated stranded wires, said wires provide connection to a load via the switching circuit;

wherein a connector is disposed on the first side of the device, sized to directly connect electrically and mechanically with a second side of an immediately adjacent device without a common apparatus;

wherein a connector is disposed on the second side of the device, sized to directly connect electrically and mechanically with a first side of an immediately adjacent device without a common apparatus;

connecting unterminated stranded wiring to the third side of the device;

attaching a removable first side cover to the first side of the device;

attaching a removable second side cover to the second side of the device.

17. The method of claim 16, further comprising:

removing the first or second side cover and replacing it with a first or second side cover containing a communications receiver or transceiver and a microcontroller attached to a printed circuit board, wherein the printed circuit board interfaces with the electrical contacts of the side of the electrical assembly and the microcontroller can be programmed to control components of the electrical assembly based on communications received via transmission wires;

removing the first or second side cover and replacing it with a first or second side cover containing a communications receiver or transceiver and a microcontroller attached to a printed circuit board, wherein the printed circuit board interfaces with the electrical contacts of the side of the electrical assembly and the microcontroller can be programmed to control components of the electrical assembly based on communications received via wireless transmission.

18. The method of claim 16, further comprising removing wire insulation and inserting the wiring through an elastomer panel, and connecting wiring to the electrical contacts disposed on the third side of the device.

19. The method of claim 16, further comprising removing wire insulation and crimping pins on the end of the wire using a crimping tool and inserting it into a connector, then plugging the connector into the device.

20. The method of claim 16, further comprising attaching the mounting bracket to a substrate.

21. A method of operating a system of direct current modular power distribution devices comprising:

supplying DC power to a first one of a plurality of devices using unterminated stranded and insulated wires through electrical contacts on a device comprising;

a housing having at least three sides;

an electrical assembly;

wherein the electrical assembly comprises multiple electronic components comprising a switching circuit for connecting an external DC power source to a load;

wherein the housing substantially encloses the electrical assembly;

wherein the electrical assembly has electrical contacts disposed on a first and second and third side of the housing;

wherein the electrical contacts on the third side are configured to engage with unterminated stranded wires, said wires provide connection to a load via the switching circuit;

wherein a connector is disposed on the first side of the device, sized to directly connect electrically and mechanically with a second side of an immediately adjacent device without a common apparatus;

wherein a connector is disposed on the second side of the device, sized to directly connect electrically and mechanically with a first side of an immediately adjacent device without a common apparatus;

wherein a first side cover attaches to the connector disposed on the first side of the housing, enclosing the electrical contacts disposed on the first side of the device between the first side cover and the housing;

wherein a second side cover attaches to the connector disposed on the second side of the housing, enclosing the electrical contacts disposed on the second side of the device between the second side cover and the housing;

distributing said power through electrical contacts disposed on the first side of the first one of a plurality of devices;

removing the first side cover on the first one of a plurality of devices and removing a second side cover on a second one of a plurality of devices, coupling the first side of the first one of a plurality of devices and a second side of a second one of a plurality of devices, thus directly connecting the first and second devices electrically and mechanically;

further distributing said power through electrical contacts disposed on a second side of the first one of a plurality of devices;

removing the second side cover on the first one of a plurality of devices and removing a first side cover on a third one of a plurality of devices, coupling the second side of the first one of a plurality of devices and a first side of a third one of a plurality of devices, thus engaging the first and third devices electrically and mechanically;

successively coupling each remaining one of a plurality of devices to an immediately preceding adjacent device.

22. The method of claim 21 further comprising:

identifying the endmost one of a plurality of devices to be uncoupled;

disconnecting the identified device from its mounting bracket;

uncoupling the identified device from the adjacent device without removing preceding devices.

23. The method of claim 21 wherein the first or second side cover contains a communications receiver or transceiver and a microcontroller attached to a printed circuit board, wherein the printed circuit board interfaces with the electrical contacts of the side of the electrical assembly and the microcontroller can be programmed to control components of the electrical assembly based on communications received via transmission wire.

24. The method of claim 21 wherein the first or second side cover contains a network communications receiver or transceiver and a microcontroller attached to a printed circuit board, wherein the printed circuit board interfaces with the electrical contacts of the side of the electrical assembly and the microcontroller can be programmed to control components of the electrical assembly based on communications received via wireless transmission.

25. The method of claim 21 wherein successively coupling further comprises removing the first side cover of a preceding device, to couple with the second side of a subsequent device.

26. The method of claim 21 wherein successively coupling further comprises removing the second side cover of a preceding device, to couple with the first side of a subsequent device.

27. The method of claim 21 further comprising attaching a removable mounting bracket to each device.

28. The method of claim 21 where the preceding devices are mounted to a substrate.

29. A method of operating a system of direct current modular power distribution devices comprising:

supplying DC power to a first one of a plurality of devices using unterminated stranded wires through electrical contacts on a device comprising;

a housing having at least three sides;

an electrical assembly;

wherein the electrical assembly comprises multiple electronic components comprising a switching circuit for connecting an external DC power source to a load;

wherein the housing substantially encloses the electrical assembly;

wherein the electrical assembly has electrical contacts disposed on the first and second and third side of the housing;

wherein the electrical contacts on the third side are configured to engage with unterminated stranded wires, said wires provide connection to a load via the switching circuit;

wherein a connector is disposed on the first side of the device, sized to directly connect electrically and mechanically with a second side of an immediately adjacent device without a common apparatus;

wherein a connector is disposed on the second side of the device, sized to directly connect electrically and mechanically with a first side of an immediately adjacent device without a common apparatus;

distributing said power through electrical contacts disposed on the side of the first one of a plurality of devices wherein a connector is disposed on a side of the device, sized to engage electrically and mechanically with a side of an adjacent device;

inserting an insulating cover configured to insulate selected electrical contacts on the side in which it was inserted and between said side and an immediately adjacent device;

coupling adjacent devices and thus engaging the devices electrically and mechanically;

successively coupling each remaining one of a plurality of devices to an immediately preceding adjacent device.

\* \* \* \* \*